(12) United States Patent
Fetcenko et al.

(10) Patent No.: US 6,830,725 B2
(45) Date of Patent: Dec. 14, 2004

(54) HYDROGEN STORAGE ALLOYS HAVING A HIGH POROSITY SURFACE LAYER

(75) Inventors: Michael A. Fetcenko, Rochester, MI (US); Stanford R. Ovshinsky, Bloomfield Hills, MI (US); Kwo Young, Troy, MI (US); Benjamin Reichman, West Bloomfield, MI (US); Taihei Ouchi, Rochester, MI (US); John Koch, Brighton, MI (US); William Mays, Commerce, MI (US)

(73) Assignee: Texaco Ovonic Battery Systems, LLC, Troy, MI (US)

( * ) Notice: Subject to any disclaimer, the term of this patent is extended or adjusted under 35 U.S.C. 154(b) by 47 days.

(21) Appl. No.: 10/405,008

(22) Filed: Apr. 1, 2003

(65) Prior Publication Data

US 2004/0194577 A1 Oct. 7, 2004

(51) Int. Cl.[7] ............................. C22C 30/00; H01M 4/38
(52) U.S. Cl. .................... 420/580; 420/900; 429/218.1; 429/220; 429/221; 429/223; 429/226
(58) Field of Search ................................ 420/580, 900; 429/218.1, 220, 221, 223, 226

(56) References Cited

U.S. PATENT DOCUMENTS 5,536,591 A * 7/1996 Fetcenko et al. ............. 429/59
6,040,087 A * 3/2000 Kawakami ................ 429/218.1
6,270,719 B1 * 8/2001 Fetcenko et al. ........... 420/588

* cited by examiner

Primary Examiner—Ngoclan T. Mai
(74) Attorney, Agent, or Firm—Kevin L. Bray; Marvin S. Siskind

(57) ABSTRACT

Electrochemical and thermal hydrogen storage alloy compositions that provide superior performance, including an electrochemical hydrogen storage alloy that provides superior low temperature discharge characteristics. The alloy compositions include microstructures in the interface region that are highly porous and that include catalytic metallic particles. The microstructures include a large volume fraction of voids having spherical or channel-like shapes and are sufficiently open structurally to facilitate greater mobility of reactive species within the microstructure and in the vicinity of catalytic metallic particles. Greater accessibility to reactive sites accordingly results. The greater mobility of reactive species and/or the greater density of catalytic particles lead to faster kinetics and improved performance (e.g. higher power), especially at low operating temperatures. The microstructures may be formed through inclusion of a microstructure tuning element in the alloy composition, through control of processing conditions and/or through inclusion of etching steps in the post-formation processing of hydrogen storage alloys.

38 Claims, 16 Drawing Sheets

HYDROGEN STORAGE ALLOYS HAVING A HIGH POROSITY SURFACE LAYER

FIELD OF THE INVENTION

The instant invention pertains to hydrogen storage alloys as well as to electrochemical cells, batteries and fuel cells using these alloys. More particularly, the instant invention relates to hydrogen storage alloys having microstructures that are highly permeable and/or that include high concentrations of catalytically active metal or metal alloy particles. Most particularly, the instant invention relates to hydrogen storage alloys suitable for use as negative electrode materials in metal hydride batteries that exhibit high powers and high discharge rates at low operating temperatures.

BACKGROUND OF THE INVENTION

Consumer and industrial applications continue to drive demand for new and efficient batteries for use as energy sources. Important goals include obtaining ever more power from increasingly smaller battery packages in an environmentally respectful fashion. Envisioned applications for batteries include everything from mobile electronics to electric vehicles. Portability, rechargeability over a large number of cycles, low cost, high power, lightweight and consistent performance over widely varying loads are among the key attributes required for batteries. The specific combination of battery performance requirements varies widely with the intended application and the battery components and materials are typically optimized accordingly. An important developing application area for rechargeable batteries is electric vehicles (EV) and hybrid electric vehicles (HEV). In these applications, the battery must have the ability to provide high currents in short time periods in order to achieve effective acceleration. High discharge rates are therefore necessary. High battery power over extended time periods are also needed so that vehicles of reasonable size and weight can be maintained in motion for reasonable time intervals without recharging. Rapid recharging over many cycles should also be possible using readily available electrical power sources. The preferred cycle life profile also requires a high number of charge/discharge cycles at a low, rather than high, depth of discharge. Progress has been made in the development of batteries for HEV applications and two HEV automobiles have recently been made available to the U.S. public. Nonetheless, the batteries used in these automobiles represent compromises and trade-offs in relevant performance parameters and new developments are needed to further the capabilities of HEV and EV products.

One aspect of rechargeable batteries for HEV, EV, 42 V SLI and other applications that has received relatively little attention is low temperature operation. For HEV and EV products it is desirable to have batteries that perform well in winter climates. Similarly, achievement of portable and stationary power sources based on rechargeable batteries that are capable of functioning outdoors in cold climates or in indoor cold environments is also desirable. A basic limitation of virtually every battery technology is a diminution of power and performance at low temperature. The deleterious effects of temperature are especially pronounced below freezing.

Nickel metal hydride batteries have emerged as the leading class of rechargeable batteries and are replacing earlier generation nickel-cadmium batteries in many applications. Current HEV and EV products, for example, utilize nickel metal hydride batteries and expanded performance of HEV and EV products in the future are expected to depend largely on the capabilities of nickel metal hydride batteries. Like other rechargeable batteries, nickel metal hydride batteries suffer significant degradation in power and performance upon a lowering of temperature.

Improvements in the low temperature performance require consideration of the underlying components and principles of operation of nickel metal hydride batteries.

Nickel metal hydride batteries typically include a nickel hydroxide positive electrode, a negative electrode that incorporates a metal containing hydrogen storage alloy, a separator and an aqueous alkaline electrolyte. The positive and negative electrodes are housed in adjoining battery compartments that are typically separated by a non-woven, felled, nylon or polypropylene separator. Several batteries may also be combined in series to form larger battery packs capable of providing higher powers, voltages or discharge rates.

The charging and discharging reactions of nickel metal hydride batteries have been discussed in the art and may be summarized as shown below:

Charging:
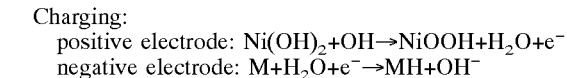
positive electrode: Ni(OH)$_2$+OH$^-$→NiOOH+H$_2$O+e$^-$
negative electrode: M+H$_2$O+e$^-$→MH+OH$^-$ Discharging
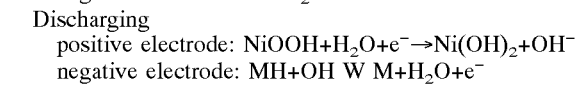
positive electrode: NiOOH+H$_2$O+e$^-$→Ni(OH)$_2$+OH$^-$
negative electrode: MH+OH W M+H$_2$O+e$^-$ Much work has been completed over the past decade to improve the performance of nickel metal hydride batteries. Optimization of the batteries ultimately depends on controlling the rate, extent and efficiency of the charging and discharging reactions. Factors relevant to battery performance include the physical state, chemical composition, catalytic activity and other properties of the positive and negative electrode materials, the composition and concentration of the electrolyte, the separator, the operating conditions, and external environmental factors. Various factors related to the performance of the positive nickel hydroxide electrode have been considered, for example, in U.S. Pat. Nos. 5,348,822; 5,637,423; 5,905,003; 5,948,564; and 6,228,535 by the instant assignee, the disclosures of which are hereby incorporated by reference. Work on suitable negative electrode materials has focused on intermetallic compounds as hydrogen storage alloys since the late 1950's when it was determined that the compound TiNi reversibly absorbed and desorbed hydrogen. Subsequent work has shown that intermetallic compounds having the general formulas AB, AB$_2$, A$_2$B and AB$_5$, where A is a hydride forming element and B is a weak or non-hydride forming element, are able to reversibly absorb and desorb hydrogen. Consequently, most of the effort in developing negative electrodes has focused on hydrogen storage alloys having the AB, AB$_2$, AB$_5$ or A$_2$B formula types.

Desirable properties of hydrogen storage alloys include: good hydrogen storage capabilities to achieve a high energy density and high battery capacity; thermodynamic properties suitable for the reversible absorption and desorption of hydrogen; low hydrogen equilibrium pressure; high electrochemical activity; fast discharge kinetics for high rate performance; high oxidation resistance; weak tendency to self-discharge; and reproducible performance over many cycles. The chemical composition, physical state, electrode structure and battery configurations of hydrogen storage alloys as negative electrode materials in nickel metal hydride have been investigated and reported in the prior art. Some of this work is described in U.S. Pat. Nos. 4,716,088; 5,277,999; 5,536,591; 5,616,432; and 6,270,719 to the instant assignee, the disclosures of which are hereby incorporated by reference.

Efforts to date indicate that intermetallic compounds are capable of effectively functioning as negative electrode materials in rechargeable batteries, but that important properties are difficult to optimize simultaneously. Hydrogen storage alloys of the $AB_5$ type, for example, generally have high initial activation, good charge stability and relatively long charge-discharge cycle life, but at the same time have low discharge capacity. Furthermore, attempts to increase the cycle life generally lead to reductions in the initial activation. Hydrogen storage alloys of the $AB_2$ type, on the other hand, typically possess high discharge capacity, but low initial activation and relatively short cycle life. Efforts to improve upon the initial activation generally come at the expense of cycle life. Other important properties include discharge rate, discharge current, and constancy of output over time. It has proven difficult in most applications to simultaneously optimize all desired battery attributes and as a result, compromises are normally made in which some properties are sacrificed at the expense of others.

Efforts to universally improve as many of the desirable performance attributes of hydrogen storage alloys as possible require a molecular level consideration of the structural and interatomic interactions of the materials used as hydrogen storage alloys. One of the instant inventors, S. R. Ovshinsky, has formulated a novel and versatile strategy for designing materials having new and/or expanded functionality. A key concept advanced by Ovshinsky is the appreciation of the new and varied degrees of freedom afforded by the disordered and amorphous states of matter. Ovshinsky recognized that the ordered crystalline lattice imposed many constraints on the structure and properties of materials due to a rigid adherence of atoms to a prescribed structural lattice and instead embraced the disordered and amorphous states for the enormous flexibility in chemical bonding, intermolecular interactions and structural configurations that they provide. Ovshinsky viewed disordered and amorphous materials in terms of constituent local structures, each of which has unique properties according to the chemical elements and topology present, which collectively and synergistically interact to produce macroscopic materials having novel structures and properties. Heretofore unachievable macroscopic properties become possible through the judicious assembly of properly tailored constituent local structures.

Through his viewpoint, Ovshinsky discovered, elucidated and developed the principles of atomic engineering, chemical modification and total interactive environment that have revolutionized the ways in which people view and understand materials and their properties. According to these principles, the structure and properties of materials are strongly interrelated and new material properties necessarily flow from new structural degrees of freedom. Ovshinsky realized that crystalline solids, with their prescribed and rigid structures, were simply incompatible with the goal of designing new materials with new functionality. On the contrary, only the disordered and amorphous states permit the structural flexibility, through control of the local chemical compositions, topology and assemblage of constituent local structures, necessary to achieve a broad new concept of materials design.

Implementation of the Ovshinsky principles in the prior art has emphasized amorphous and disordered inorganic materials such as tetrahedral amorphous semiconductors (e.g. Si, Ge), trivalent, sheet like systems formed from elements of Group V of the periodic table (e.g. As), and divalent, chain and/or ring systems formed from elements of Group VI of the periodic table (e.g. Se, Te, S). Representative applications of the Ovshinsky principles to materials based on elements selected from Groups IV, V and VI are included in U.S. Pat. Nos. 4,177,473 and 4,177,474 to Ovshinsky; the disclosures of which are hereby incorporated by reference. In these patents, Ovshinsky teaches the use of modifier materials to control the electrical activation energy and conductivity of inorganic materials by modifying defect electronic configurations through orbital interactions of one or more modifying elements with microvoids, dangling bonds, nearest neighbor interactions, or lone electron pairs. These orbital interactions provide effects such as charge compensation, polyvalency, lone pair compensation, three center bonding, and lone pair-lone pair influences that lead to the formation of new electronic states and/or deactivation of native electronic states that act to determine the Fermi level and electrical activation energy. Inclusion of one or more modifier elements constituted a means for perturbing local composition, topology and intermolecular interactions in such a way as to produce the structural deviations of the unmodified material necessary to achieve a preferential level of conductivity. Orbital interactions of the modifiers with the surrounding disordered or amorphous material permitted the establishment of local structures and bonding configurations that are not possible in the crystalline state. By controlling the amount and chemical identity of the modifying element, Ovshinsky demonstrated variability of electrical conductivity over a range spanning more than ten orders of magnitude.

In U.S. Pat. Nos. 4,520,039 and 4,664,960, the disclosures of which are hereby incorporated by reference, Ovshinsky further teaches the inhomogeneous arrangement of constituent local structures in disordered and amorphous materials. Inhomogeneous disordered and amorphous materials include local structures whose chemical compositions, topology and orbital interactions are non-uniform over macroscopic length scales throughout a material. Inhomogeneity provides further opportunities to increase the range of structures, and hence properties, available from a material because it provides a means for selectively controlling the placement of atoms and their nearest neighbor interactions to produce a tailored distribution of chemical and topological environments within a material. A disordered or amorphous material that is homogeneous, on the contrary, benefits from chemical and topological flexibility locally, but necessarily includes an implicit constraint in that homogeneity requires repetition of local chemical composition and topology within some length scale over macroscopic distances. Inhomogeneity further aids the designer of materials because individual chemical and topological environments may be mixed, matched and assembled at will to achieve macroscopic materials having a wider array of properties. Inhomogeneity, for example, permits formation of materials in which the electronic, magnetic, chemical and phonon properties of a material may be selectively coupled or decoupled to one another. Graded materials are one example of inhomogeneous materials.

A need exists for improved rechargeable batteries having higher powers and discharge rates at low temperatures. With respect to nickel metal hydride batteries, the barrier to low temperature performance appears to reside primarily in the operating characteristics of the negative hydrogen storage alloy electrode. Consequently, a need exists for improving the performance of hydrogen storage alloys at low temperatures. New concepts in materials design are required to meet this need.

SUMMARY OF THE INVENTION

The instant invention includes high porosity hydrogen storage alloys that, when included as the active component of a negative electrode in a nickel metal hydride battery, lead to batteries that provide higher discharge rates and higher powers, especially at low operating temperatures. The instant alloys may also be utilized as thermal hydrogen storage alloys and in fuel cells. The instant invention utilizes the Ovshinsky principles of atomic engineering, chemical modification and total interactive environment to improve the kinetics of hydrogen storage alloys. The improved kinetics achieved with the instant hydrogen storage alloys provide significantly improved low temperature operating characteristics and make high power operation at −30° C. practical for the first time.

The instant modified porosity alloys include different forms of base alloys represented by the AB, $AB_2$, $AB_5$ or $A_2B$ families of hydrogen storage materials where component A is a transition metal, rare earth element or combination thereof and component B is a transition metal element, Al or combination thereof. Representative examples of component A include La, Ce, Pr, Nd, and combinations thereof including mischmetal. Representative examples of component B include Ni, Co, Mn, Al and combinations thereof. The instant alloys include catalytic metallic particles surrounded by a supporting matrix that has been engineered to improve access of electrochemically and thermally reactive species to catalytic sites, thereby improving kinetics.

In one embodiment, a base alloy is modified with one or more microstructure tuning elements that act to favorably tailor the properties of the supporting matrix to provide a higher concentration of catalytic metallic particles as well as greater accessibility of reactive species to the catalytic metallic particles. The microstructure tuning elements facilitate an accelerated and directed preferential corrosion of the support matrix during activation or operation to provide a more porous and accessible support matrix that also includes locally enriched concentrations of catalytic metallic particles distributed throughout the surface region of the instant hydrogen storage alloys. As the support matrix becomes more porous and less oxidic, the catalytic metallic particles may become at least partially self supporting. The modifications of the support matrix provided by the instant microstructure tuning elements increase the number of catalytic sites and facilitate access of reactants to catalytic sites as well as departure or transport of reaction products from catalytic sites thereby providing faster kinetics for hydriding/dehydriding and charging/discharging processes of thermal and electrochemical hydrogen storage alloys. The instant microstructure tuning elements include Cu, Fe, Al, Zn and Sn.

In another embodiment, the support matrix is made more porous through alloy processing. Control of certain alloy processing parameters (e.g. heat treatment temperature, processing ambient, time of contact with air, electrolyte etc.) increases the porosity of the support matrix. In still another embodiment, inclusion of etching as a step during processing also provides a way to increase the porosity of the support matrix.

In a preferred embodiment, porosity of the support matrix is increased through formation of open channels or voids having a cross sectional dimension of 1–2 nm that extend in three dimensions throughout the surface layer. The channels or voids provide pathways to and from catalytic metallic particles that facilitate access of reactant species to and departure of product species from the catalytic metallic particles. The kinetics of charging/discharging processes and hydriding/dehydriding processes are thereby enhanced.

Electrodes may be formed from the instant high porosity alloys and used as negative electrodes in nickel metal hydride batteries to achieve batteries providing superior power and discharge rates, especially at low temperatures. In one embodiment, a C cell NiMH battery including the instant high surface interface porosity B12 alloy $(La_{10.5}Ce_{4.3}Pr_{0.5}Nd_{1.4}Ni_{64.5}Co_{3.0}Mn_{4.6}Al_{6.0}Cu_{5.4})$ as the active negative electrode material provides a specific power of about 2000 W/kg at 80% SOC and 35° C. In another embodiment, a C cell NiMH battery including the instant high surface interface porosity B12 alloy as the active negative electrode material provides a specific power of 150 W/kg at 50% SOC and −30° C. By comparison, a conventional alloy $(La_{10.5}Ce_{4.3}Pr_{0.5}Nd_{1.4}Ni_{60.0}Co_{12.7}Mn_{5.9}A_{4.7})$ provided a specific power of essentially zero under the same low temperature conditions in the same battery package.

DETAILED DESCRIPTION

Figure 1A:
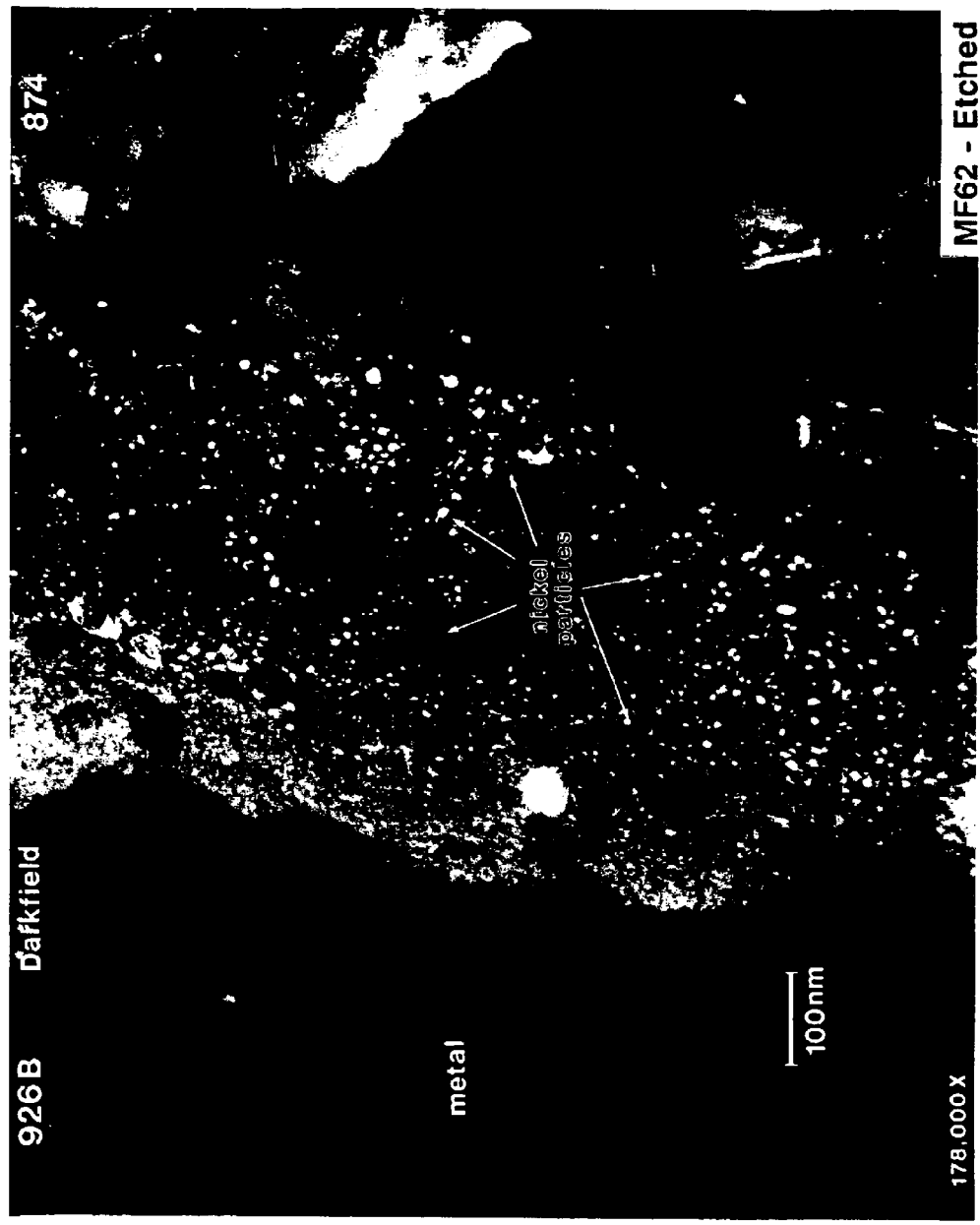
FIG. 1A. Transmission electron micrograph showing the microstructure of a prior art alloy described in the '591 patent.

The instant invention provides high porosity hydrogen storage alloys generally suitable for use as electrochemical or thermal hydrogen storage materials. The instant alloys may be used as the active material in electrodes for batteries, electrochemical cells (galvanic or electrolytic) or fuel cells. In a preferred embodiment, the instant hydrogen storage alloys are used as the negative electrode in a nickel metal hydride battery that provides superior performance in low temperature operating environments. The instant invention employs the Ovshinsky principles of atomic engineering, chemical modification, and total interactive environment to achieve improved performance through enhancements of the reaction kinetics of hydrogen storage alloys achieved through modifications of the microstructure of the surface region. In U.S. Pat. Nos. 4,431,561 (the '561 patent), 4,623,597 (the '597 patent), 5,840,440 (the '440 patent) and 5,536,591 (the '591 patent) by Ovshinsky and colleagues, the disclosures of which are hereby incorporated by reference, application of the Ovshinsky principles to the design of sites of chemical reactivity in hydrogen storage alloys is discussed. Hydrogen storage alloys include catalytic sites and hydrogen storage sites. The catalytic sites typically form atomic hydrogen from hydrogen gas or water and the hydrogen storage sites typically store atomic hydrogen for later retrieval. The process of forming and storing atomic hydrogen may be referred to as charging the hydrogen storage alloy and the process of retrieving stored atomic hydrogen to form water, molecular hydrogen or some other species may be referred to as discharging the hydrogen storage alloy.

Hydrogen storage materials that can function using hydrogen gas as a source of hydrogen are referred to herein as thermal hydrogen storage materials. During hydriding of thermal hydrogen storage materials in a typical example, hydrogen gas adsorbs onto the surface of the material, is converted to atomic hydrogen by the catalytic sites, and the atomic hydrogen is stored in the hydrogen storage sites. The dehydriding of thermal hydrogen storage materials in this example includes release of atomic hydrogen from hydrogen storage sites and recombination of atomic hydrogen at the catalytic sites to form hydrogen gas.

Hydrogen storage materials that can function using water as a source of hydrogen are typically utilized in an electrochemical cell in an electrochemically driven process and are referred to herein as electrochemical hydrogen storage alloys. During charging of an electrochemical hydrogen storage alloy in a representative example, a current is provided to the hydrogen storage alloy in the presence of water to form a metal hydride and hydroxyl ions. The alloy is formally reduced in the charging process. The discharging of a metal hydride in this example involves the oxidation of the metal hydride in the presence of hydroxyl ions to form a metal or metal alloy and water. Electrons are produced during discharging to form a current.

In many cases, a particular material may function as both an electrochemical hydrogen storage material and a thermal hydrogen storage alloy. In such cases, the functionality is determined by the operating environment in which the material is employed.

The '561 patent considers hydrogen storage alloys comprised of a matrix modified by modifier elements designed to store atomic hydrogen derived from hydrogen gas. The '561 patent teaches that the inclusion of modifying elements (e.g. certain transition metals or rare earths) alters the local chemical environments of the hydrogen storage matrix to provide a material having an increased density of hydrogen storage sites. As a result, the overall hydrogen storage capacity is improved.

The '597 patent considers electrochemical hydrogen storage materials and teaches the use of modifying elements to manipulate the local chemical environment and structure of metals or metal alloys to achieve electrochemical hydrogen storage alloys that exhibit high charging and discharging efficiencies. The modifying elements are multi-orbital modifiers (e.g. transition metals having multiple d orbitals or rare earths having multiple f orbitals) that introduce disorder to the material through unique bonding configurations and orbital interactions to provide an increased number and range of hydrogen storage sites. Depending on the amount and chemical identity of the modifier, various manifestations of disorder are possible. Disorder in the form of polycrystalline, microcrystalline, intermediate range order or amorphous regions, for example, are possible as are compositional, topological, and positional disorder.

The disorder taught in the '597 patent also led to an increased density of catalytic sites thereby improving the charging and discharging processes. Conventional chemical catalysis is a surface phenomenon that occurs at surface irregularities such as dislocation sites, crystal steps, kinks, voids, impurities, defects etc. Since these surface irregularities are unintentional, their number is low and the overall catalytic efficiency is oftentimes unnecessarily low. Instead of relying on the accidental occurrence of surface irregularities, the '597 patent teaches the application of the Ovshinsky principles to the formation and assembly of catalytic sites having varying degrees of activity and selectivity with respect to one or more reactions. In doing so, catalytic activity is not restricted to surfaces, but rather may become a bulk property of a material. As a result, the number of catalytic sites is increased beyond the number associated with unintentional surface irregularities. The topological freedom afforded by disordered and amorphous materials permits construction and strategic placement of local structural units or sites having desired catalytic performance in high numbers. The engineering of interactions between neighboring sites leads to materials whose catalytic performance is more than a simple superposition of individual contributing sites.

The '440 patent considered the storage capacity of hydrogen storage alloys in further detail. Among the teachings of the '440 patent was a recognition of the degree to which the number of hydrogen storage sites needed to be increased in order to achieve substantial improvements in storage capacity. The '440 patent demonstrated a substantial increase in the number of hydrogen storage sites by introducing disorder and defects into a hydrogen storage material. In addition to conventional hydrogen storage sites, the '440 patent teaches the formation of non-conventional hydrogen storage sites where the number of non-conventional sites can be 50% or more of the number of conventional sites. The total hydrogen storage capacity is thereby increased. The '440 patent further taught the control of disorder and density of non-conventional storage sites through control of crystallite size. Smaller crystallite sizes were correlated with improved hydrogen storage capacity. Smaller crystallites are believed to include more topological disorder and a greater number of non-conventional storage sites. Other forms of disorder were further shown to provide non-conventional hydrogen storage sites. These forms of disorder include microstructures containing microcrystalline, nanocrystalline, amorphous, and multiphase regions.

The '561, '597, and '440 patents provided modified hydrogen storage alloys exhibiting greater numbers of catalytic and hydrogen storage sites. The teachings of those patents considered improvements with respect to the nominal or bulk composition of the hydrogen storage material and showed how catalytic and hydrogen storage sites need not be restricted to surfaces or the exterior portions of a hydrogen storage material, but could also be designed into interior portions by properly controlling disorder and topology. These advances led to significantly improved hydrogen storage alloys and concomitantly to better electrodes for batteries and fuel cells.

In U.S. Pat. No. 5,536,591 (the '591 patent), Fetcenko, Ovshinsky and colleagues consider further advances in the catalytic performance of hydrogen storage alloys. The '591 patent considers the compositional microstructure of hydrogen storage alloys in greater detail and recognizes that the composition of hydrogen storage alloys is more complicated than is indicated by the nominal or bulk composition. Specifically, the '591 patent recognizes the importance of a surface oxide layer that is typically present in hydrogen storage alloys and its influence on the charging and discharging processes. In electrochemically driven processes, for example, the oxide layer constitutes an interface between the electrolyte and the bulk hydrogen storage alloy and accordingly may also be referred to as an interface layer or region. Since oxide layers are typically insulating, they generally inhibit the performance of electrodes utilizing metals or metal alloys. Prior to electrochemical reaction, metal or metal alloy electrodes are typically activated, a process in which the surface oxide layer is removed, reduced or modified to improve performance. The process of activation may be accomplished, for example, by etching, electrical forming, pre-conditioning or other methods suitable for removing or altering excess oxides or hydroxides. See, for example, U.S. Pat. No. 4,717,088; the disclosure of which is hereby incorporated by reference.

The '591 patent extended the Ovshinsky principles to the oxide layer of hydrogen storage materials and thereby demonstrated improved catalytic activity. Specifically, hydrogen storage alloys having Ni-enriched catalytic regions in the oxide layer are shown to have high catalytic activity. The Ni-enriched catalytic regions may be prepared, for example, through an activation process in which elements of the hydrogen storage alloy other than Ni are preferentially corroded to provide metallic nickel alloy of about 50–70 Å distributed throughout the oxide layer. The Ni-enriched catalytic regions function as catalytic sites having high activity. Formation of the Ni-enriched catalytic regions of the '591 patent is promoted by a pre-activation thermal annealing step. The annealing step acts to condition the surface region of a hydrogen storage alloy and renders it more susceptible to the formation of Ni-enriched catalytic regions during activation. Additional discussion of annealing in the context of the instant invention is provided hereinbelow.

As discussed in U.S. Pat. No. 4,716,088 it is known that the steady state surface composition of V—Ti—Zr—Ni alloys can be characterized as having a relatively high concentration of metallic nickel. An aspect of the '591 patent is a significant increase in the frequency of occurrence of these nickel regions as well as a more pronounced localization of these regions. More specifically, the materials of the '591 patent have enriched nickel regions of 50–70 Å in diameter distributed throughout the oxide interface and varying in proximity from 2–300 Å, preferably 50–100 Å, from region to region. This is illustrated in FIG. 1A, which is a reproduction of FIG. 1 of the '591 patent, where the nickel regions are shown as what appear as grains on the surface of the oxide interface at 178,000 X. As a result of the increase in the frequency of occurrence of these nickel regions, the materials of the '591 patent exhibit increased catalysis and conductivity.

The increased density of Ni regions in the '591 patent provides powder particles having an enriched Ni surface. Prior to the '591 patent, Ni enrichment was attempted unsuccessfully using microencapsulation. The method of Ni microencapsulation results in the deposition of a layer of Ni about 100 Å thick at the metal-electrolyte interface. Such an amount is excessive and results in no improvement of performance characteristics.

The enriched Ni regions of the '591 patent can be formed via the following fabrication strategy: Specifically formulate an alloy having a surface region that is preferentially corroded during activation to produce the enriched Ni regions. Without wishing to be bound by theory, it is believed, for example that Ni is in association with an element such as Al at specific surface regions and that this element corrodes preferentially during activation, leaving the enriched Ni regions of the '591 patent. "Activation" as used herein and in the '591 patent refers to "etching" or other methods of removing excessive oxides, such as described in the '088 patent, as applied to electrode alloy powder, the finished electrode, or at any point in between in order to improve the hydrogen transfer rate.

The Ni-enriched catalytic regions of the '591 patent are discrete regions. The catalytic activity of the Ni-enriched catalytic regions is controllable by controlling the size, separation, chemical composition and local topology. In one embodiment of the '591 patent, the discrete Ni-enriched catalytic regions include metallic Ni particles having a diameter of 50–70 Å or less that are separated from each other by distances of 2–300 Å. The Ni-enriched catalytic regions are distributed throughout the oxide layer. The portions of the oxide layer surrounding the Ni-enriched catalytic regions or catalytic metallic Ni particles shall hereinafter be referred to as the support matrix, supporting matrix, supporting oxide, oxide support or the like. The Ni-enriched catalytic regions are thus supported by or within the support matrix. The support matrix may include fine and coarse grained oxides and/or hydroxides of one or more of the metallic elements present in the hydrogen storage alloy composition and may also include multiple phases, some of which may be microcrystalline, nanocrystalline or amorphous.

The supporting matrix and catalytic sites thereof are further discussed in U.S. Pat. No. 6,270,719 (the '719 patent) to Fetcenko, Ovshinsky and colleagues. The '719 patent teaches additional modification of Ni-enriched regions to provide further improvements in catalytic activity. The '719 patent teaches formation of catalytically active metal-enriched regions comprising not only metallic Ni particles, but also particles of metal alloys such as alloys of Ni with one or more of Co, Cr, V, Pt, Pd, Au, Ag, Rh, Ti, Mn, or Al as well as other metal alloys (e.g. PtAu). The '719 patent further teaches that alloying may provide particles having an FCC structure instead of the BCC structure of the metallic Ni particles of the '591 patent The instant invention further considers the nature of the oxide support layer of hydrogen storage alloys and is particularly concerned with extending the Ovshinsky principles to the microstructure of the support matrix in order to obtain improved performance of electrochemical and thermal hydrogen storage alloys. The performance of hydrogen storage materials is based on factors that include the intrinsic activity of catalytic sites, the number of catalytic sites, interactions between catalytic sites, interactions between catalytic sites and hydrogen storage sites, the number of hydrogen storage sites and the stability of hydrogen storage sites. These factors influence the hydrogen storage capacity, thermodynamic properties, and kinetics of hydrogen storage materials. The '561, '597, '440, '591 and '719 patents described hereinabove have demonstrated various ways to improve the activity of catalytic sites, the number of catalytic sites, the number of hydrogen storage sites, and the stability of hydrogen storage sites.

The instant invention is directed at additional features of the support matrix and/or catalytic metallic regions or particles that are beneficial to the performance of hydrogen storage materials. More specifically, the instant invention is concerned with beneficial modifications of the region at or near the surface of a hydrogen storage alloy. The region at or near the surface of a hydrogen storage alloy may also be referred to herein as the surface or interface region, surface or interface layer, surface or interface oxide or the like. The surface or interface region constitutes an interface between the electrolyte and the bulk portion of an electrochemical hydrogen storage alloy. In one embodiment herein, the interface region includes catalytic metal or metal alloy particles having angstrom scale dimensions that are supported by a surrounding support matrix having a higher degree of porosity than with previously known metal hydride alloys. As described more fully hereinbelow, the relative proportions of catalytic metal or metal alloy particles and support matrix in the surface region vary with the composition and processing treatments of the instant hydrogen storage alloys.

One aspect of the instant invention focuses on tuning the microstructure of the support matrix in the interface region of hydrogen storage alloys so as to create a more open network structure that facilitates the access of reactant species to catalytic sites and the departure of product species away from catalytic sites through voids or channels in the interface region. Voids and channels of sufficient size relative to participating reactant species (in charging or discharging processes) facilitate the mobility of reactant species and may be referred to as reactant voids or channels. The presence of reactant voids or channels in the interface region of the instant alloys leads to greater utilization of catalytic sites and improved performance, particularly at low temperature. Another aspect of the instant invention focuses on tuning the microstructure of the interface region of hydrogen storage alloys so as to increase the density of catalytic sites. A greater number of catalytic sites in a given volume of hydrogen storage alloy leads to an increase in overall catalytic reactivity.

The beneficial microstructure tuning effects present in the instant hydrogen storage alloys may be achieved through inclusion of a microstructure tuning element in the alloy composition, through control of one or more alloy processing parameters (e.g. heat treatment temperature, processing ambient, time of contact with air etc.), through inclusion of one or more etching steps during processing or after alloy formation or a combination of the above. In a preferred embodiment, microstructure tuning according to the instant invention provides a hydrogen storage alloy having a high density of catalytic sites surrounded by a support matrix having a high degree of porosity so that the mobility of reactant and product species in the vicinity of catalytic sites is substantially unimpeded.

In one embodiment, the instant hydrogen storage materials include a base alloy that is designed to have a formula capable of expanding on the preferential corrosion of the '591 patent to not only allow the formation of metallic nickel alloy regions distributed throughout the oxide, but to further preferentially corrode to create a high porosity pore network within the oxide to create greater accessibility to the catalysts. Formula modifiers modify the porosity of the support matrix and/or the density of catalytic sites within the surface region of a base alloy. Porosity modification may occur during alloy formation, post-formation processing, activation or during operation as an electrochemical or thermal hydrogen storage alloy. The formula modifiers of the instant invention may hereinafter be referred to as modifying elements, microstructure tuning elements, microstructure modifiers, support matrix modifiers, supporting oxide modifiers, surface or interface region modifiers or the like. The presence of the formula modifiers in combination with other elements provide an overall alloy formulation that provides the beneficial microstructural and porosity effects of the instant invention.

In another embodiment, a high porosity support matrix is obtained through proper control of processing parameters during formation, annealing, processing or operation of a hydrogen storage alloy. In still another embodiment, etching steps applied after alloy formation provide a high porosity support matrix. Etching steps may include basic and/or acidic etching processes designed to selectively or preferentially etch one or more elements or oxides or hydroxides thereof in the interface region of a hydrogen storage alloy thereby rendering the interface region more porous.

In the absence of microstructure tuning according to the instant invention, the base alloys may have metal enriched catalytic regions that include catalytically active particles comprised of nickel, nickel alloy as well as other metals or metal alloys as described in the '591 and '719 patents. As described more filly hereinbelow, microstructure tuning according to the instant invention permits control of the porosity of the support matrix surrounding the catalytically active particles and thereby enhances the mobility of relevant molecules or molecular species in electrochemical or thermal charging or discharging processes with respect to the support matrix. The microstructure of the instant alloys have high porosity surface regions that include voids or channels that facilitate access of reactant species within the surface region as well as to and from catalytic particles or regions. The instant voids or channels may thus be viewed as reactant voids or reactant channels. The instant microstructure tuning may also provide a higher density of catalytic metallic particles in the interface region of the instant hydrogen storage materials. The instant microstructure tuning leads to better charging and/or discharging kinetics, especially at low temperatures, as shown in several examples presented hereinbelow.

The characteristics and range of modifications of the support matrix surrounding the catalytic metal-enriched regions of the hydrogen storage materials described in the '591 and '719 patents have not been fully optimized in the prior art. Incidental variations of the support matrix as a result of effects intended to improve the performance or number of catalytic and hydrogen storage sites have been mentioned, but little teaching of the intentional modification of the support matrix has been presented. In the '591 patent, for example, formation of Ni-enriched regions was believed to provide a somewhat more porous supporting oxide. In the '719 patent, as another example, inclusion of Mn in the bulk composition of the hydrogen storage alloy was proposed to provide a multivalent $MnO_x$ component to the oxide layer where the multivalent component may have catalytic properties.

While not wishing to be bound by theory, the instant inventors believe that the supporting oxide of the prior art hydrogen storage alloys is dense and that a dense oxide support is detrimental to the performance of hydrogen storage alloys, particularly at low temperatures. Even though better porosity is expected in the materials of the '591 patent, it is believed that the supporting oxide is still sufficiently dense, even in these materials, to inhibit performance. The instant inventors believe that performance may be improved by generally increasing the porosity of the supporting oxide and with the instant invention, extend the Ovshinsky principles of atomic engineering, chemical modification and total interactive environment to the microstructural tuning of the supporting matrix surrounding catalytic metallic particles or other catalytically enriched regions of a hydrogen storage alloy.

Tuning of the porosity of the matrix supporting metal enriched catalytic regions represents an additional degree of freedom for optimizing the performance of electrochemical and thermal hydrogen storage materials. In addition to the intrinsic activity, number, and interactions among and between catalytic sites, hydrogen storage sites and surrounding material described hereinabove, high performance further requires that a hydrogen bearing source such as hydrogen gas or water has accessibility to a catalytic site. The concept of accessibility further extends to the ability of byproducts formed during charging or products formed during discharging to depart catalytic sites so that the site may be further utilized.

As an example, an electrochemical hydrogen storage alloy that includes metal enriched catalytic regions may be considered wherein the alloy is included as the negative electrode of a rechargeable battery in the presence of an aqueous electrolyte. Upon charging, water accesses a metal enriched catalytic site to form atomic hydrogen for storage and a hydroxyl ion byproduct. In order for this charging process to occur, the support matrix surrounding metal enriched catalytic sites must be sufficiently open or porous to permit water molecules from the electrolyte to access the metal enriched catalytic sites. Additionally, in order to continually effect catalysis at a metal enriched catalytic site, the support matrix must permit hydroxyl ion formed during charging to migrate, diffuse or otherwise depart from the catalytic site so that the access of further water molecules to the catalytic site is not impeded or otherwise blocked by the presence of a hydroxyl ion. Similar considerations apply on discharging. Upon discharging, stored hydrogen combines with hydroxyl ions at a catalytic site to form water. In order to achieve high discharge rates, it is preferable for the support matrix to be sufficiently porous to allow for the facile departure of water molecules formed upon discharging away from the catalytic site. If the departure of water molecules is inhibited by the support matrix, the catalytic site is effectively blocked and additional discharging may be inhibited Optimal discharging requires not only rapid formation of product, but also rapid departure or transport of products (and byproducts, if present) away from the catalytic site so that the site is available for further participation in the discharge reaction. In addition to reactants, products and by-products, the accessibility and mobility of ions in the electrolyte to catalytic sites, hydrogen storage sites and within a hydrogen storage material may also be relevant to the overall performance and efficiency of charging and discharging reactions.

Insufficient porosity of the support matrix may inhibit access to or departure from catalytic sites, for example, by presenting a structure having openings or channels that are too small to provide facile migration of molecular species to and/or from a catalytic site. Thus, even if a particular catalytic site (e.g. within a metal enriched catalytic region or catalytic metallic particle) has high activity, fast kinetics for charging and discharging etc., inability of reactant molecules or electrolyte species to access the catalytic site or inability of product molecules or electrolyte species to depart the catalytic sites may have a deleterious effect on the performance of a hydrogen storage material.

In addition to structural barriers associated with accessing or departing a catalytic site, a supporting matrix may also present steric, electronic or other barriers. Electronic barriers generally arise from intermolecular forces of attraction or repulsion that may be present between the support matrix and migrating or diffusing molecules or chemical species. Electrostatic, van der Waals, bonding etc. interactions may act to impede migration or diffusion even if sufficiently large structural pathways for migration are available within the support matrix. The concept of porosity as used herein is intended to broadly encompass barriers or inhibitions, regardless of origin, provided by the support matrix to the migration or diffusion of species participating in charging or discharging processes. A highly porous support matrix provides few barriers to migration or diffusion, while a low porosity or highly dense support matrix provides substantial barriers to migration or diffusion.

The ability of a molecule or other chemical species to access or depart a catalytic site may also be referred to as the mobility of the molecule within or with respect to the support matrix. A molecule or chemical species having high mobility is readily able to penetrate, migrate through, diffuse within or otherwise transport through or within the support matrix. High mobility implies greater accessibility of reactants to catalytic sites during charging and greater ability of products to depart from a catalytic site during discharging. High mobility also implies a greater ability of byproducts to depart from a catalytic site during either or both of charging and discharging. High mobility of a species through a support matrix implies that the support matrix provides few barriers (structurally, sterically, electronically etc.) to migration or diffusion. The transport of electrolyte species is similarly facilitated through a support matrix that provides high mobility. Phenomenologically, species mobility and accessibility to catalytic sites may be manifested in the charge transfer resistance, particularly at low temperature, of an electrochemically driven process. Charge transfer resistance is a measure of the facility of the basic electrodic electron transfer process of an electrochemical reaction. A high charge transfer resistance implies an inhibited electron transfer process. Factors contributing to an inhibition include low number of catalytic sites, low activity of catalytic sites or inability of relevant molecules and molecular species to access or depart catalytic sites. A highly dense oxide support matrix inhibits the charge transfer process by impeding access to and/or departure from a catalytic site. This inhibition contributes to a large charge transfer resistance and slows the kinetics of an electrochemical process.

As the porosity of the support matrix increases, the charge transfer resistance decreases as species mobility and accessibility to catalytic sites improves. At sufficient porosity, the support matrix is no longer the dominating factor in determining the charge transfer resistance. Instead, the number and/or activity of catalytic sites or the concentration of reactive species may become controlling.

The mobility of a molecule or other molecular species with respect to a support matrix may be influenced by external factors such as the temperature. Temperature is a relevant consideration because it controls the thermal energy of a molecule. Higher temperatures provide higher thermal energies to molecules and molecular species that access or depart from a catalytic site thereby better enabling them to overcome structural, steric, electronic or other barriers to mobility provided by a support matrix. A support matrix that provides sufficient mobility at one temperature with respect to a particular charging or discharging process may not provide sufficient mobility at a lower temperature because of a reduction of thermal energy available to one or more molecules or molecular species requiring access to or departure from a catalytic region. The thermal energy of mobile molecules or species relative to the activation energies of barriers to mobility provided by the support matrix influences the effectiveness of charging and discharging.

In the instant invention, hydrogen storage materials having tailored support matrix porosity that enhances the mobility of relevant molecules and molecular species are provided. Mobility enhancements are provided at elevated temperatures, room temperature and low temperatures. Mobility enhancements are provided by the 'inclusion or formation of reactant voids or channels in the surface region of the instant alloys having a sufficient size and number to facilitate migration, diffusion etc. of participating species within the surface region as well as to or from catalytic and/or hydrogen storage sites within the alloy. In a preferred embodiment, an instant hydrogen storage material is utilized as the active material in the negative electrode of a nickel metal hydride battery that provides superior discharge kinetics at temperatures below 0° C. In one embodiment, a nickel metal hydride battery that provides superior discharge kinetics at −30° C. is provided.

Achievement of a high porosity support matrix may be achieved, for example, through a preferential corrosion of the surface layer. The surface layer is typically a multicomponent oxidic phase that includes oxides or hydroxides of one or more of the metals present in the formula of a hydrogen storage alloy. Oxides or hydroxides based on different metals exhibit different degrees of corrosion in an electrochemical cell during alloy processing, activation and/or operation. While not wishing to be bound by theory, the instant inventors believe that microstructure tuning according to the instant invention facilitates an accelerated and directed preferential corrosion of the surface oxide layer. In one embodiment herein, microstructure tuning according to the instant invention is provided through the inclusion of formula modifiers, which may be referred to as microstructure tuning element, in the alloy composition. According to the accelerated and directed preferential corrosion effect in this embodiment, corrosion effects ordinarily encountered during activation and/or operation of an electrochemical cell may become exaggerated in the presence of a microstructure tuning element and as a result, a more porous support matrix is formed. In other embodiments, accelerated and preferential corrosion may occur or be facilitated in later processing through control of processing parameters during alloy formation, annealing, treatment, or operation or through inclusion of basic and/or acidic etching steps upon or during alloy formation.

In addition to porosity modifications, accelerated and directed preferential corrosion may also lead to a relative local enhancement, at or in the vicinity of the surface, of the concentration of one or more elements that are less susceptible to corrosion. As in the '591 and '719 patents incorporated by reference hereinabove, local enhancements in the concentrations of one or more metals may facilitate the formation of metal enriched regions that include catalytic metallic particles. The instant microstructure tuning, with its ability to effect exaggerated corrosion, may thus provide for a substantially increased density of catalytic metallic particles in the instant hydrogen storage alloys relative to the alloys described in the '591 or '719 patents.

While not wishing to be bound by theory, the instant inventors believe that the porosity modifications and/or increased density of catalytic metallic particles afforded by the instant microstructure tuning may, at least in some embodiments of the instant hydrogen storage alloys, occur synergistically. That is, an increase in the porosity of the support matrix may promote the formation of catalytic metallic particles and vice versa. Effects associated with the accelerated and directed preferential corrosion in the presence of microstructure tuning according to the instant invention include a reduction in the amount of oxide support matrix and an increase in the local concentration of less corrosive elements at and in the vicinity of the surface of the instant hydrogen storage alloys. The tendency for exaggerated corrosion has the effect of substantially reducing the amount of the oxide matrix available to support catalytic metallic particles. As the oxide matrix is corroded, the local oxygen concentration decreases. As a result, the tendency of the more highly localized less corrosive elements that remain at or in the vicinity of the surface to form metallic particles (instead of, for example, metal oxides) is enhanced. Furthermore, since the surrounding oxide matrix is corrosively depleted and may not be substantially available to provide support to the greater density of metallic particles that form, it is believed that the metallic particles may become substantially self supporting by, for example, forming a contiguous particulate network in which individual metallic particles become interconnected to form an at least partially non-oxidic support matrix. Rather than merely providing local metal enriched regions that include catalytic particles supported on an oxide matrix as in the '591 patent, the instant invention may provide a support matrix that is in itself catalytic and comprised of an assembly of substantially self-supported catalytic metallic particles.

In the instant invention, the concentration of the microstructure tuning element in the composition or the degree of microstructure tuning of the instant alloys influences the relative abundance of oxide-supported and self-supported catalytic metallic particles as well as the void or channel volume in the interface region. When the concentration of the microstructure tuning element or degree of microstructure tuning according to the instant invention is low, the catalytic metallic particles are expected to form at a lower concentration and to be substantially supported by a relative dense oxide matrix. The catalytic metallic particles under these conditions are expected to be well separated and surrounded by a relatively dense and lightly porous support matrix. As the concentration of the microstructure tuning element increases, the support matrix becomes increasingly porous due to the accelerated and directed preferential corrosion effect described hereinabove. As the support matrix becomes less abundant in the vicinity of the catalytic metallic particles, it is less able to support those particles and the tendency of the catalytic metallic particles to become self-supporting increases. The proportion of self-supported catalytic metallic particles increases, while the proportion of oxide supported catalytic metallic particles decreases. The tendency of the less corrosive elements to form catalytic metallic particles also increases and is expected to lead to catalytic metallic particles that occur at higher density and with smaller separations.

When the concentration of the microstructure tuning element or degree of microstructure tuning according to the instant invention is intermediate, the region at or in the vicinity of the surface of the instant hydrogen storage alloys includes both self-supported and oxide supported catalytic metallic particles with the porosity of the remaining oxide increasing as the concentration of microstructure tuning element increases. When the concentration of microstructure tuning element or degree of microstructure tuning according to the instant invention is high, the catalytic metallic particles become substantially self-supporting. An oxidic matrix may remain, but would be of low density and only secondarily involved in supporting the catalytic metallic particles.

The porosity of the surface region may be expressed in terms of a pore volume fraction or void volume fraction where a pore or void corresponds to an opening or open portion of the surface region. A pore or void may be localized or extended in the hydrogen storage material and include, for example, channels. While not wishing to be bound by theory, the instant inventors believe that an initial effect of microstructure tuning according to the instant invention is void formation or enlargement in the general vicinity of catalytic metallic particle. In this initial effect, microstructure tuning according to the instant invention facilitate corrosion locally in a hydrogen storage material at positions that are separated from each other. Concomitant depletion of the support matrix and formation of a metallic particle at a site of corrosion leads to a consolidation of one or more of the metals of the oxidic support matrix to form a metallic particle as well as to removal of oxygen and the more highly corrodable metals in the vicinity of a metallic particle. The local environment at a site of corrosion thus includes a metallic particle and a void. The size of the void depends on the volume of the metallic particle formed, the amount of material removed, and the response of the hydrogen storage material to void formation. A void represents an unoccupied, open, non-dense region of a hydrogen storage material. Voids correspond to defects in the hydrogen storage material and are regions of weak mechanical strength that may facilitate a collapse or densification of the interface region. A densification may occur due to a reduced resistance to the deformation of atoms adjacent to a void that results upon removal of atoms to form a void. Atoms that formerly occupied a void provide mechanical resistance to the deformation of neighboring atoms. Upon removal of these atoms through corrosion, the resistance to deformation is removed and as a result, a hydrogen storage material may collapse to fill in the void. The extent to which a hydrogen storage material collapses depends on the mechanical strength of the material surrounding a void as well as on the thermodynamics and kinetics of the atomic displacement processes associated with collapse. Substantial collapse leads to a reduction in pore volume and inhibited mobility of molecules and chemical species in the interface region.

While not wishing to be bound by theory, the instant inventors believe that microstructure tuning according to the instant invention inhibits collapse of the interface region upon formation of voids so that void volume is increased and mobility of molecules and chemical species through and near voids is promoted. In one model, the instant inventors believe that microstructure tuning according to the instant invention increases the rate of formation of catalytic metallic particles to such a degree that catalytic metallic particles form on timescales faster than those required for the collapse of the surrounding support material needed to fill in a void. In this model, high void volumes are kinetically "frozen" or retained in the interface region. The consequences of this model include the formation or retention of voids that have sizes comparable to or larger than the sizes of the catalytic metallic particles.

As indicated hereinabove, an initial effect of microstructure tuning according to the instant invention is void formation in the vicinity of catalytic metallic particles in the interface region where voids are relatively isolated from each other. As microstructure tuning according to the instant invention progresses and becomes more pronounced (e.g. by increasing the concentration of a microstructure tuning element, using more prolonged or stronger etches, etc.), the number of metallic particles formed, the volume fraction of voids and/or the porosity of the interface region increase. Eventually, neighboring voids will overlap to form extended void structures such as channels or platelets may form to provide continuous openings that extend throughout the interface region. As the porosity of the support matrix increases, a porosity network that includes one or more of voids, platelets and channels is formed locally and throughout the interface region.

The instant formula modifier elements in one embodiment herein include transition metals and post-transition metals. In one embodiment, Sn or Zn is used as a porosity modifier. In a preferred embodiment, Fe is used as a porosity modifier. In a most preferred embodiment, Cu is used as a porosity modifier. The general approach is to view the allow formula as a whole. Preferential corrosion requires that a spectrum of elements exist, some that oxidize and corrode, others that oxidize and passivate and others that remain metallic. Most preferably, there are multiple elements in the corrosion and passivation categories giving greater diversity of rates. In this context, the above mentioned modifiers (Cu, Fe, Sn, Zn) might actually work against the desired microstructural and porosity properties if they were combined with a base alloy already too high in corroding species. Other elements that may assist in the proposed invention include Al, Si and V. Embodiments including one or more porosity 'modifiers are within the scope of the instant invention.

A key is to provide access voids to the catalyst It is possible that non-modifier element approaches may also operate to provide the beneficial microstructural and porosity effects of the instant invention, such as chemical pretreatments designed to selectively attack one or more of the support oxide elements. For example, HF may provide the final desired oxide porosity.

Hydrogen storage materials suitable for microstructure tuning according to the instant invention include base hydrogen storage alloys comprising one or more transition metals or rare earths as well as base alloys in combination with a microstructure tuning element Base alloys having the formula types $AB$, $AB_2$, $AB_5$, or $A_2B$ and mixtures thereof are within the scope of the instant invention where components A and B may be transition metals, rare earths or combinations thereof in which component A generally has a stronger tendency to form hydrides than component B.

In the base AB hydrogen storage compositions, A is preferably Ti, Zr, V or mixtures or alloys thereof and B is preferably selected from the group consisting of Ni, V, Cr, Co, Mn, Mo, Nb, Al, Mg, Ag, Zn or Pd and mixtures or alloys thereof. Base AB compositions include ZrNi, ZrCo, TiNi, and TiCo as well as modified forms thereof. Representative base AB compositions and modified forms thereof within the scope of the instant invention include those described in U.S. Pat. Nos. 4,623,597; 5,840,440; 5,536,591; and 6,270,719 incorporated by reference hereinabove as well as in U.S. Pat. No. 5,096,667; the disclosure of which is hereby incorporated by reference.

Base $A_2B$ compositions include $Mg_2Ni$ as well as modified forms thereof according to the Ovshinsky principles in which either or both of Mg and Ni is wholly or partially replaced by a multi-orbital modifier.

Base $AB_2$ compositions are Laves phase compounds and include compositions in which A is Zr, Ti or mixtures or alloys thereof and B is Ni, V, Cr, Mn, Co, Mo, Ta, Nb or mixtures or alloys thereof. The instant invention also includes base $AB_2$ compositions modified according to the Ovshinsky principles described hereinabove. Representative base $AB_2$ compositions within the scope of the instant invention are discussed in U.S. Pat. No. 5,096,667 incorporated by reference hereinabove.

Base $AB_5$ compositions include those in which A is a lanthanide element or a mixture or alloy thereof and B is a transition metal element or a mixture or alloy thereof. $LaNi_5$ is the prototypical base $AB_5$ compound and has been modified in various ways to improve its properties. Ni may be partially replaced by elements including Mn, Co, Al, Cr, Ag, Pd, Rh, Sb, V, or Pt, including combinations thereof. La may be partially replaced by elements including Ce, Pr, Nd, or other rare earths including combinations thereof Mischmetal may also wholly or partially replace La. The instant invention also includes base $AB_5$ compositions modified according to the Ovshinsky principles described hereinabove. Representative base $AB_5$ compositions within the scope of the instant invention have been discussed in U.S. Pat Nos. 5,096,667 and 5,536,591 incorporated by reference hereinabove.

Modified Mg-based alloys such as those described in U.S. Pat. Nos. 5,616,432 and 6,193,929, the disclosures of which are hereby incorporated by reference, are also within the scope of the instant invention.

The base alloys of the instant invention may also comprise non-stoichiometric compositions achieved through application of the Ovshinsky principles. Non-stoichiometric compositions are compositions in which the ratio of elements may not be expressible in terms of simple ratios of small whole numbers. Representative non-stoichiometric compositions include $AB_{1\pm x}$, $AB_{2\pm x}$, $AB_{5\pm x}$, and $A_2B_{1\pm x}$, where x is a measure of the non-stoichiometric compositional deviation. The base alloys of the instant invention may also comprise multiphase materials where a multiphase material is a combination or mixture of materials having different stoichiometries, microstructures and/or structural phases. Structural phases include crystalline phases, microcrystalline phases, nanocrystalline phases and amorphous phases.

In some embodiments, increased support matrix porosity and/or increased density of catalytic metallic particles results from inclusion of a modifying element in the base alloy composition. In other embodiments, inclusion of a modifying element in combination with a reduction in the amount of one or more elements of the base alloy composition provides increased porosity of the support matrix and/or increased density of catalytic metallic particles. In still other embodiments, microstructure tuning occurs through formation, processing, treatment, activation or operation steps as described hereinabove.

The instant hydrogen storage alloys may be prepared by a variety of methods that include melt casting, induction melting, rapid solidification, mechanical alloying, sputtering and gas atomization. Representative preparations are described in EXAMPLES 1 and 2 hereinbelow. An important aspect of the preparation process of many hydrogen storage alloys is a post-formation annealing step in which the material as formed during preparation is subjected to an annealing treatment. The annealing treatment includes heating the material to an elevated temperature for a sufficient period of time. An effect of annealing is to alter or condition the surface of the hydrogen storage material in such a way that the material is susceptible to or responsive to the accelerated and directed preferential corrosion process described hereinabove that leads to formation of angstrom scale catalytic metal or metal alloy particles and greater void volume fraction in the surface region. The extent to which accelerated and directed preferential corrosion forms angstrom scale catalytic particles during activation is influenced by the local composition at or near the surface. In the materials of the '591 and '719 patents incorporated by reference hereinabove, local nickel enrichment in the surface region was observed to enable or facilitate formation of angstrom scale catalytic nickel or nickel alloy particles upon activation. A suitable annealing step induces a condition in the surface region in which the nickel concentration is enriched relative to the statistical concentration expected from the formula unit of the hydrogen storage alloy. Annealing under appropriate conditions initiates a segregation of nickel away from the bulk and toward the surface region to provide a nickel enriched surface region.

While not wishing to be bound by theory, the instant inventors believe that formation of a surface region having a sufficiently high nickel concentration enables formation of angstrom scale catalytic nickel or nickel alloy particles upon activation. In addition to a high nickel concentration, a nickel enriched surface region may also include microstructural features that facilitate formation of angstrom scale catalytic nickel or nickel alloy particles. The annealing induced segregation, for example, may be accompanied by local changes in phase, structure, crystallinity, grains, interfaces etc. in the surface region that may be conducive to formation of angstrom scale catalytic nickel or nickel alloy particles during activation. In connection with the materials of the '591 patent, the instant inventors have demonstrated that angstrom scale catalytic nickel or nickel alloy particles do not form upon activation of materials that have not been subjected to an annealing step. Instead of unoxidized metallic nickel or nickel alloy particles, the surface region of unannealed materials comprises oxidized nickel in the form of an $Ni^{n+}$-rich oxide phase.

The segregation effect observed upon annealing the materials of the '591 patent is believed to be enhanced under the influence of microstructure tuning according to the instant invention. Inclusion of a microstructure tuning element, for example, may lead to greater segregation of nickel and a greater local enrichment of nickel concentration in the instant hydrogen storage alloys relative to the hydrogen storage alloys of the '591 or '719 patents. A local enrichment of other metals such as Co or a microstructure tuning element itself may also occur. As a result, the preferential corrosion that occurs upon activation is more pronounced in the instant alloys and leads to the effects of increased support matrix porosity,- greater void volume fraction, increased density of catalytic metallic nickel or nickel alloy particles and/or increased self supporting behavior within the interface region described hereinabove in connection with the accelerated and directed preferential corrosion effect provided according to the microstructure tuning of the instant invention. Microstructure tuning according to the instant invention may facilitate formation of catalytic metallic particles and increase the volume of voids in the interface region. According to a model described hereinabove, the instant microstructure tuning may increase the kinetic rate of formation of catalytic metallic particles and inhibit collapse of any remaining, undepleted support material into the void.

The formula modifiers used in some embodiments of the instant invention have appeared in some prior art alloys, but have not been utilized to effect the beneficial microstructural phenomena associated with the instant alloys. In U.S. Pat. No. 5,738,953 to Lichtenberg et al., for example, alloys having the formula $MmNi_vAl_wMn_xCo_yM_z$ are disclosed where Mm is mischmetal and M is Cu, Fe or a mixture of Cu and Fe. Alloys prepared by melt casting and gas atomization are disclosed. Since the preparation of the Lichtenberg melt cast alloys did not include an annealing step, catalytic metallic particles (such as those described in the '591 patent) are not expected to form. As a result, the accelerated and directed preferential corrosion facilitated by the presence of Cu or Fe during activation according to the instant invention would not occur in the melt cast alloys of Lichtenberg et al. and the Lichtenberg alloys would not exhibit the beneficial high porosity microstructure of the instant alloys. In fact, Lichtenberg indicated that these alloys had significantly reduced cycle life and specifically disclosed gas atomization as a necessary means to recover cycle life. The gas atomized alloys of Lichtenberg included a heat treatment step, but the effect of the heat treatment was to increase the storage capacity of the as-formed gas atomized alloys by decomposing and diffusing the boundary regions between the gas atomized particles. This heat treatment has the effect of decreasing the surface area of the gas-atomized particles and lowering the overall porosity through a fusion of smaller particles into larger particles. The Lichtenberg alloys also show a noticeable decrease in initial capacity and in capacity after repeated cycling relative to the cobalt containing reference alloy discussed in their patent The inclusion of Cu and/or Fe in the Lichtenberg alloys thus lead to a decrease in battery capacity relative to prior art compositions. The Lichtenberg patent further fails to teach improved low temperature power or capacity.

In U.S. Pat. No. 6,329,100 to Imoto et al., alloys having the formula $MmNi_aCo_bAl_cM_d$ are disclosed where Mm is mischmetal and M is Mn and/or Cu. The alloys specifically include a combination of two different compositions. The alloys were prepared by melt casting, but were not subject to an annealing step and the included Cu would not beneficially alter the microstructure during activation as in the instant alloys. The alloys of Imoto et al. are further reported to have improved discharge rates at 0° C., but this improvement is due to a Teflon coating treatment, hydrogen reduction treatment or acid treatment Further, the disclosed 0° C. performance, while improved, is less spectacular than the low temperature improvements associated with the instant alloys. The Teflon coating treatment is believed to protect the hydrogen storage alloy from the electrolyte during operation and improves the hydrogen absorption efficiency, especially during overcharging. The hydrogen reduction and acid treatments are believed to enhance the concentration of non-mischmetal components near the surface so that wettability with the electrolyte is enhanced. No teaching of modifications to the porosity of support matrix, nature or distribution of catalytic particles, or other microstructural phenomena is presented in the patent of Imoto et al. The alloys of Imoto et al. do not benefit from the accelerated and directed preferential corrosion of the instant invention.

In U.S. Pat. No. 6,106,768 to Lee et al., several $AB_5$ alloys are disclosed where A is mischmetal and B includes one or more of Ni, Co, Mn, and Al along with a modifier selected from the group consisting of Cr, Cu, Zn, Fe, or Si. The alloys of Lee et al. were prepared by arc-melting under Ar and were not subject to an annealing step. The modifiers were included as substitutes for Co in an attempt to lower alloy cost and improve hydrogen storage capacity. The modifiers were selected for their stronger affinity for hydrogen and their greater oxidation resistance relative to Co. According to Lee et al., the modifiers improve cycle life by promoting the formation of a highly dense oxide layer that leads to reduced degradation upon repeated cycling. The invention of Lee et al. thus teaches away from the more porous oxide support provided by the microstructure tuning elements of the instant invention.

In U.S. Pat. No. 6,331,367 to Ebihara et al., hydrogen storage alloys having a porous surface layer are described where the pore diameter is between 1–2 nm and the pore volume fraction is less than 1%. The preparation of the alloys of Ebihara et al. included separate alkaline and acid etching steps to form a nickel-condensed layer and a surface layer with the stated pore diameter. As described more fully hereinbelow, the pore sizes and pore volume fractions of the Ebihara et al. alloys are significantly smaller than those of the instant alloys. The larger void sizes and larger void volume fractions of the instant alloys facilitate the superior low temperature power and-discharge characteristics of the instant alloys.

The instant alloys may be used as thermal or electrochemical hydrogen storage materials in devices such as fuel cells or batteries. Battery types include flat cells, wound cells, cylindrical cells, prismatic cells, sealed cells, vented cells etc. Batteries formed from the instant hydrogen storage materials provide higher powers than currently available batteries at room temperature and especially at temperatures below room temperature such as 0° C. or −30° C. Batteries formed from the instant hydrogen storage materials are rechargeable and may be used in HEV or EV applications and as starter batteries in conventional vehicles such as automobiles, buses, tractors, etc.

Further insight into the scope of the instant invention are provided in the illustrative examples presented hereinbelow. The following examples are intended to be representative of, rather than comprehensively defining of, the instant invention.

EXAMPLE 1

In this example, the preparation and formulas of several hydrogen storage alloys having the stoichiometric and non-stoichiometric $AB_5$ composition are presented. Each alloy was prepared by combining mischmetal and the remaining components in elemental form (purity of each element >99%) in the required stoichiometric ratio in an MgO crucible. The mischmetal used in this example included La, Ce, Pr, and Nd in a molar ratio of La:Ce:Pr:Nd= 10.5:4.3:0.5:1.4. The total mass of the combined starting elements was approximately 2 kg. The crucible was subsequently placed into a water-cooled induction furnace under a 1 atm. argon atmosphere, heated to about 1350° C. and held at that temperature for 15–20 minutes. During heating, the material in the crucible melted and became superheated to provide better homogeneity. After this heating step, the material was cooled down to just slightly above its melting point (ca. 1280° C.) and immediately poured into a steel mold through a tundish. After pouring, the material was cooled to room temperature. The resulting ingot was then annealed at 950° C. for 8 hours in a vacuum chamber pumped by a diffusion pump. After annealing, the ingot was returned to room temperature. The cooled ingot was then mechanically pulverized and sieved through a 200 mesh filter.

Representative $AB_5$ alloys prepared using the above method are presented in Table 1. In these alloys, component A is mischmetal and component B is a combination of transition metals. The compositions shown in Table 1 are in at. % and correspond to molar proportions. Entries of 0 indicate that the element was not intentionally included in the preparation of the alloy. The B and B0 alloys are conventional alloys that are not modified according to the instant invention The B alloy is a typical commercial alloy composition and the B0 alloy is similar to commercial alloys. The alloys B1, B3, B4, and B7–B12 include a microstructure tuning element (Cu, Fe, or Zn) and correspond to modified forms of the base alloy B0 according to the instant invention. The alloys B2, B5 and B6 include excess Ni relative to B0.

TABLE 1

| Alloy | La | Ce | Pr | Nd | Ni | Co | Mn | Al | Cu | Fe | Zn |
|---|---|---|---|---|---|---|---|---|---|---|---|
| B   | 10.5 | 4.3 | 0.5 | 1.4 | 60.0 | 12.7 | 5.9 | 4.7 | 0   | 0   | 0   |
| B0  | 10.5 | 4.3 | 0.5 | 1.4 | 64.5 | 8.4  | 4.6 | 6.0 | 0   | 0   | 0   |
| B1  | 10.5 | 4.3 | 0.5 | 1.4 | 64.5 | 5.0  | 4.6 | 6.0 | 3.4 | 0   | 0   |
| B2  | 10.5 | 4.3 | 0.5 | 1.4 | 67.9 | 5.0  | 4.6 | 6.0 | 0   | 0   | 0   |
| B3  | 10.5 | 4.3 | 0.5 | 1.4 | 65.5 | 5.0  | 4.6 | 6.0 | 0   | 2.4 | 0   |
| B4  | 10.5 | 4.3 | 0.5 | 1.4 | 65.9 | 5.0  | 4.6 | 6.0 | 2.0 | 0   | 0   |
| B5  | 10.5 | 4.3 | 0.5 | 1.4 | 69.9 | 3.0  | 4.6 | 6.0 | 0   | 0   | 0   |
| B6  | 10.5 | 4.3 | 0.5 | 1.4 | 71.5 | 3.0  | 3.0 | 6.0 | 0   | 0   | 0   |
| B7  | 10.5 | 4.3 | 0.5 | 1.4 | 63.0 | 5.0  | 4.6 | 6.0 | 4.9 | 0   | 0   |
| B8  | 10.5 | 4.3 | 0.5 | 1.4 | 61.5 | 5.0  | 4.6 | 6.0 | 6.4 | 0   | 0   |
| B9  | 10.5 | 4.3 | 0.5 | 1.4 | 62.7 | 8.4  | 3.0 | 6.0 | 3.4 | 0   | 0   |
| B10 | 10.5 | 4.3 | 0.5 | 1.4 | 64.5 | 5.0  | 4.6 | 6.0 | 1.7 | 0   | 1.7 |
| B11 | 10.5 | 4.3 | 0.5 | 1.4 | 64.5 | 5.0  | 4.6 | 6.0 | 0   | 0   | 3.4 |
| B12 | 10.5 | 4.3 | 0.5 | 1.4 | 64.5 | 3.0  | 4.6 | 6.0 | 5.4 | 0   | 0   |

The relative amount of microstructure tuning element in the composition may be expressed in terms of an atomic ratio of microstructure tuning element to mischmetal in the alloy. The at. % of mischmetal in the alloys presented in Table 1 is 16.7, which is the sum of the at. % of the elements La, Ce, Pr and Nd. The relative amount of a microstructure tuning element may thus be expressed as the ratio of the at. % of the element to 16.7. In the B1 alloy, for example, the atomic ratio of copper to mischmetal is 3.4:16.7 or 0.204: 1. Corresponding ratios can be computed for other alloys.

Modified compositions including other rare earth and/or transition metals may be prepared similarly. Rare earths may also be combined in the form of individual elements or in the form of mischmetal compositions having a different proportion or combination of rare earth elements than the mischmetal used in this example.

EXAMPLE 2

In this example, the preparation and formulas of several hydrogen storage alloys having the stoichiometric and non-stoichiometric AB and $AB_2$ compositions are presented. Each alloy was prepared by combining the elements in the required stoichiometric ratio and processing in a manner similar to the alloys described in EXAMPLE 1. Additional information about the range of processing temperatures and processing conditions generally may be found in the '719, '088, and '591 patents incorporated by reference hereinabove.

Representative AB and $AB_2$ alloys prepared using the above method are presented in Table 2. The compositions shown in Table 1 are in at. % and correspond to molar proportions. Entries of 0 indicate that the element was not intentionally included in the preparation of the alloy.

TABLE 2

| Alloy | Ti | Zr | Ni | Cr | Co | Mn | Cu | Zn |
|---|---|---|---|---|---|---|---|---|
| MF140.72  | 13.0 | 24.0 | 35.0 | 8.0 | 5.0 | 15.0 | 0   | 0   |
| MF140.103 | 13.0 | 24.0 | 33.0 | 8.0 | 5.0 | 15.0 | 2.0 | 0   |
| MF140.104 | 13.0 | 24.0 | 31.0 | 8.0 | 5.0 | 15.0 | 4.0 | 0   |
| MF140.105 | 13.0 | 24.0 | 33.0 | 8.0 | 5.0 | 15.0 | 0   | 2.0 |
| MF140.106 | 13.0 | 24.0 | 31.0 | 8.0 | 5.0 | 15.0 | 0   | 4.0 |

EXAMPLE 3

In this example, microstructure tuning of the surface region of hydrogen storage alloys according to the instant invention is demonstrated. More particularly, an increase in the porosity of the support matrix surrounding catalytic metallic particles is demonstrated using the B1 and B12 alloys described in EXAMPLE 1 as representative alloys exhibiting microstructure tuning according to the instant invention. Comparisons between the beneficial microstructures of the instant invention and the microstructure of the prior art alloys of the '591 patent are also made.

FIG. 1A shows a darkfield transmission electron micrograph of a prior art alloy in accordance with the '591 patent The '591 alloys comprise hydrogen storage materials having the composition (base alloy)$_a$Co$_b$Mn$_c$Fe$_d$Sn$_e$ where the base alloy comprises 0.1 to 60 at. % Ti, 0.1 to 40at. %Zr, 0 to 60at. % V, 0.1 to 57at. % Ni, and 0 to 56at. % Cr, bis 0 to 7.5at. %, c is 13to 17 at. %, d is to3.5at. %, e is 0 to 1.5at. %, and a+b+c+d+e=1000at. %. As discussed in the '591 patent, the surface region of the '591 alloys include catalytic metallic nickel particles 50–70 Å in diameter distributed throughout the interface region and varying in proximity from 2–300 Å. In the darkfield image of FIG. 1 A, the catalytic metallic nickel particles appear in white. The catalytic metallic nickel particles are supported by a surrounding support matrix that has low porosity.

Figure 1B:
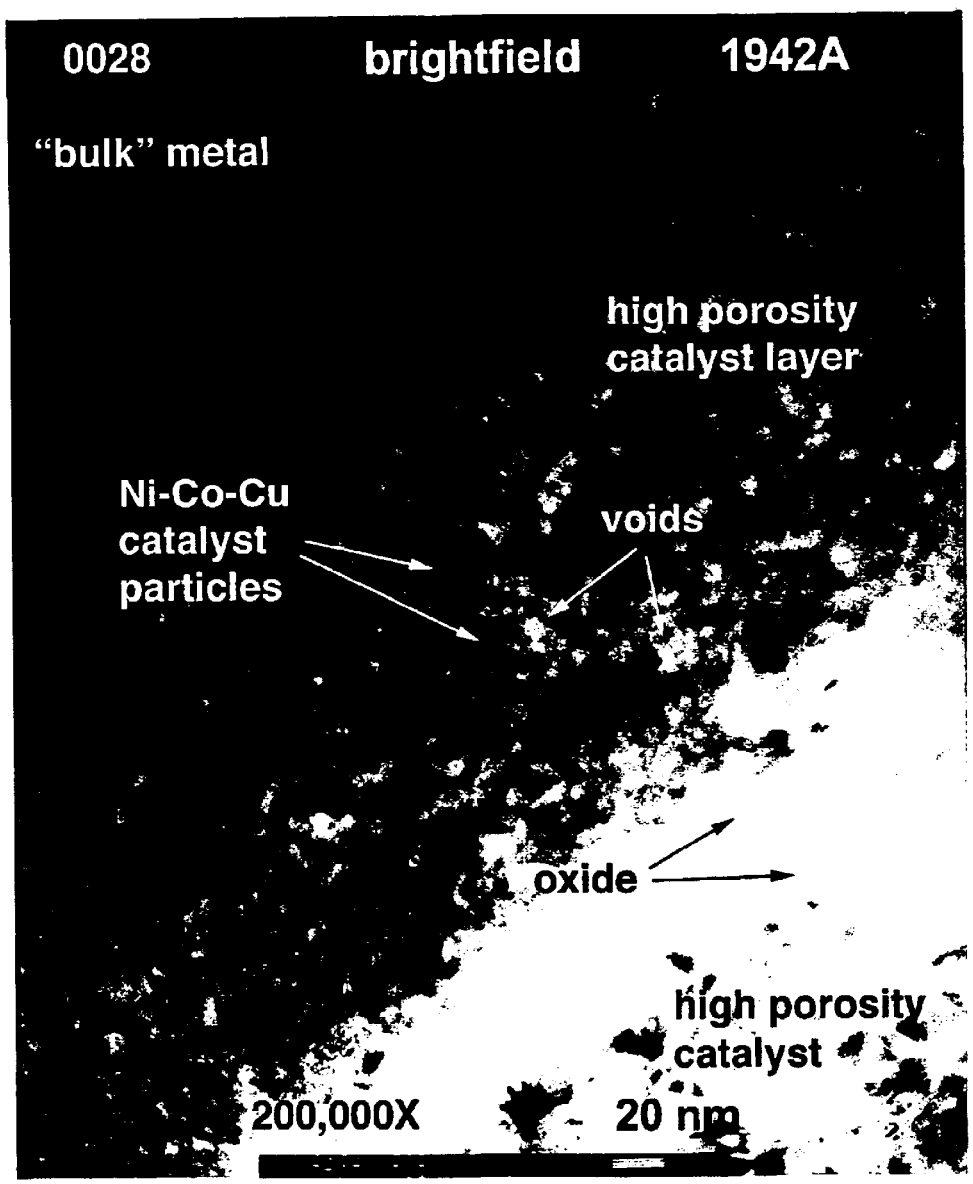
FIG. 1B. Transmission electron micrograph showing the microstructure of the instant B1 alloy.

The microstructure of the B1 alloy was imaged using transmission electron microscopy (TEM) and is depicted in brightfield mode in FIG. 1B herein. The B1 alloy is a modified form of the base B0 alloy (described in EXAMPLE 1) in which the element Cu is included in the composition, the amount of Co is reduced and the amount of Al is increased. The image shows metallic catalytic particles that contain Ni, Co, Cu or a combination thereof as well as voids in the interface region of the instant B1 alloy. The catalytic metallic particles appear as dark regions in the brightfield micrograph while the voids appear as bright spots. Selected catalytic particles and voids are specifically identified in the image. The catalytic particles and voids are contained within a surrounding oxidic support matrix (shown in grayscale and referred to as high porosity catalyst layer). The catalytic metallic particles and voids are distributed throughout the surrounding support matrix. A portion of the bulk portion of the B1 alloy is also shown in FIG. 1B (dark region labeled ""bulk" metal").

The image of the B1 alloy indicates that its microstructure is highly porous with a high concentration of voids and a high concentration of catalytic metallic particles. The length bar applicable to the image is shown in the lower portion of the image. The magnification scale of the image (200,000X) is such that the length bar corresponds to a distance of 20 rm. Using the length bar, it is evident that the interface region of the instant B1 alloy includes catalytic metallic particles having sizes or diameters of less than about 100 Å. The diameters of the catalytic metallic particles occur in a range extending from about 10 Å to about 100 Å. Catalytic metallic particles having sizes throughout this range are evident in the micrograph. Narrower size distributions within this range are also achievable using methods discussed, for example, in the '591 and '719 patents incorporated by reference hereinabove. Embodiments including catalytic metallic particles having diameters less than 50 Å are within the scope of the instant invention as are embodiments including catalytic metallic particles having diameters less than 30 Å.

The proximity of the catalytic metallic particles relative to each other vary over a wide range and is a feature that varies with the volume fraction of catalytic metallic particles and voids in the interface region. Embodiments in which the catalytic metallic particles vary in proximity from 2–300 Å are within the scope of the instant invention as are embodiments in which the catalytic metallic particle vary in proximity from 50–100 Å.

In some portions of the interface region, the catalytic particles impinge on one another to provide partially self-supporting behavior and interconnectivity. The voids are generally spherical in shape and have sizes similar to those of the catalytic particles. In some portions of the interface region, adjacent voids merge to form more extended open structures. In comparison to the prior art '591 alloys, the microstructure of the instant B1 alloy is significantly more porous and includes a similar or higher concentration of catalytic metallic particles.

Figure 1C:
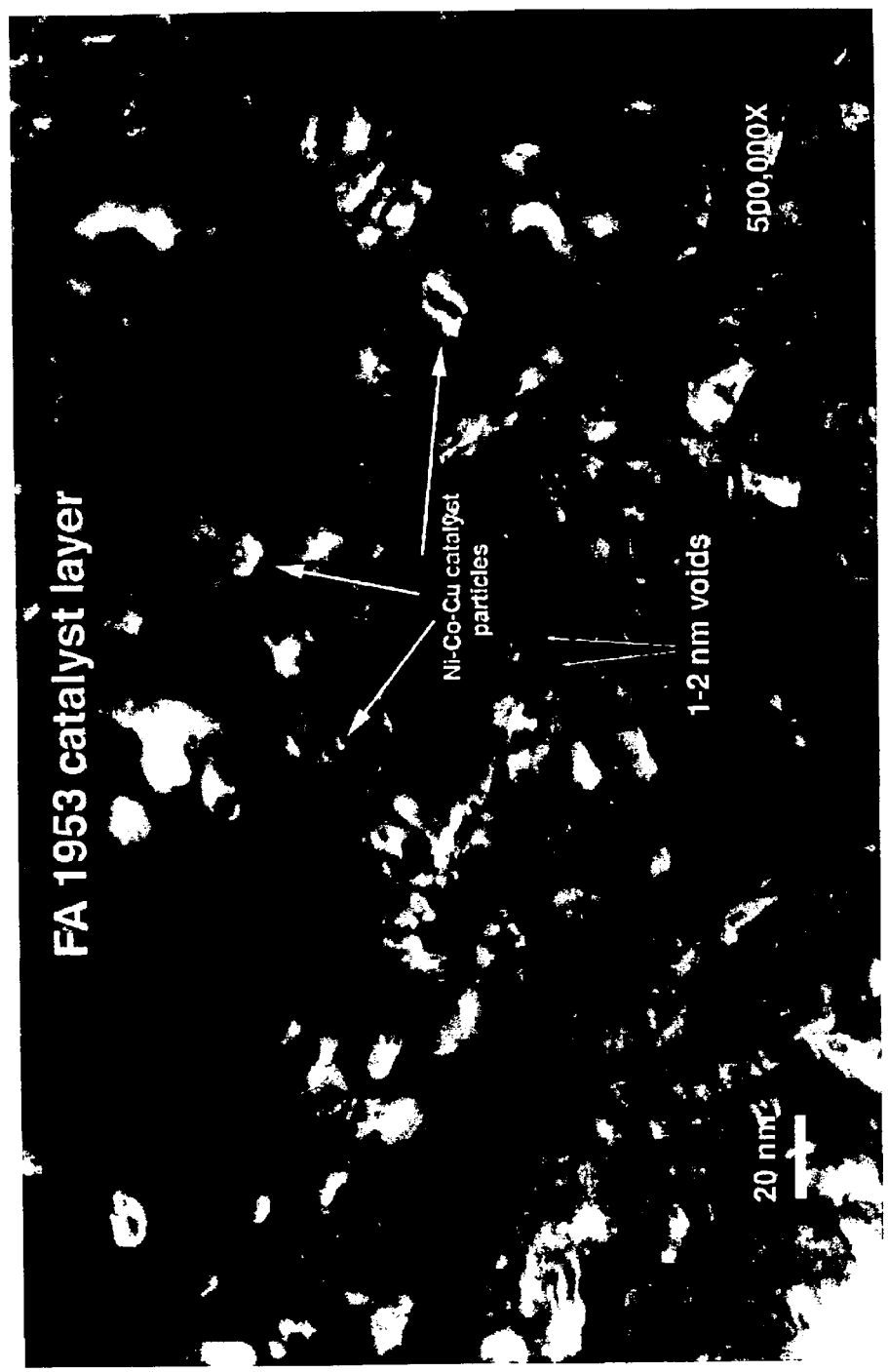
FIG. 1C. Transmission electron micrograph showing the microstructure of the instant B12 alloy.

The microstructure of the interface region of the instant B12 alloy is depicted in the darkfield transmission electron micrograph of FIG. 1C. The magnification of the image is 500,000X and a 20 nm length bar is indicated in the image. The B12 alloy includes a higher concentration of the microstructure tuning element Cu than the B1 alloy and a lower concentration of Co. The microstructure of the B12 alloy includes catalytic metallic particles comprising nickel, cobalt, copper or a combination thereof with sizes similar to those described hereinabove for the B1 alloy. The catalytic metallic particles appear in white in the darkfield image of FIG. 1C. Selected catalytic particles are specifically identified in the image. The catalytic metallic particles are distributed throughout the interface region.

A noteworthy feature of the microstructure of the B12 alloy is the presence of a large number of channels between the catalytic metallic particles throughout the interface region. The channels are labeled "1–2 nm voids" and appear as dark objects in the darkfield image of FIG. 1C. The channels have a transverse cross-sectional dimension of about 1–2 nm and longitudinal dimension that is longer, up to about 20–30 rm. The channels may have a tubular shape or may have platelet-like structures. Spherical, non-channel voids may also be present The voids are distributed throughout the interface region. In comparison to the instant B1 alloy depicted in FIG. 1B, the microstructure of the instant B12 alloy includes a greater void volume and larger average void sizes. The microstructure of the instant B12 alloy also includes a greater number and extent of extended void structures. The trends observed for the B1 alloy are enhanced in the B12 alloy as more pronounced tuning of the microstructure according to the instant invention has occurred. These voids are believed to be responsible for the improved low temperature (e.g. −30° C.) operation.

EXAMPLE 4

In this example, a comparison of the microstructures of samples of the B, B1 and B12 hydrogen storage alloys discussed in EXAMPLE 1 hereinabove is presented. More specifically, the typical thickness of the interface region, average size of catalytic metallic particles and volume fractions of support matrix, catalytic metallic particles and voids in the interface region is described for the three alloys.

Figure 1D:
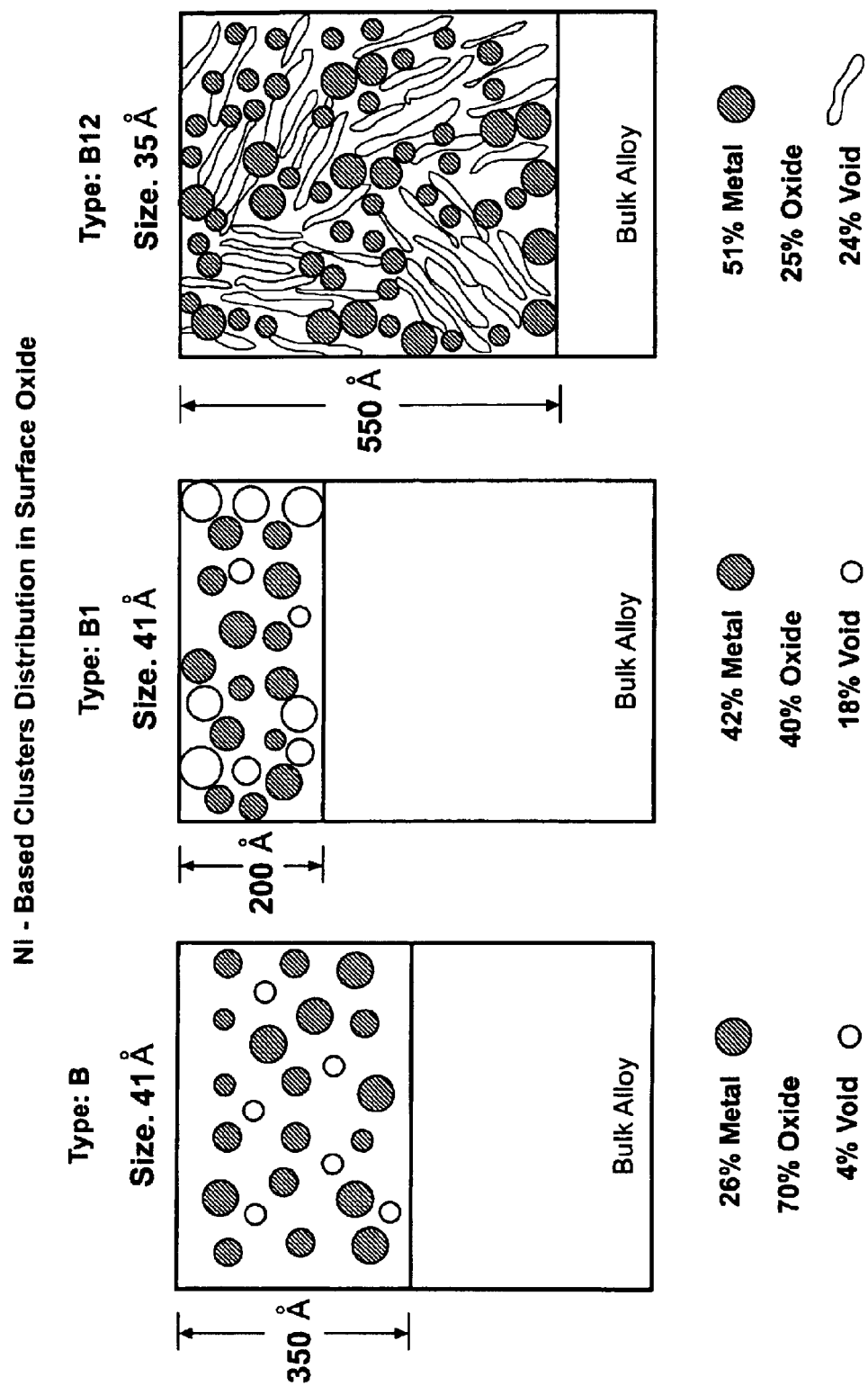
FIG. 1D. Comparison of the microstructure of samples of the B, B1 and B12 alloys.

A schematic comparison of the microstructure of the B, B1 and B12 alloys is provided in FIG. 1D herein. As seen in EXAMPLE 1, the concentration of copper increases and the concentration of cobalt decreases from the B to the B1 to the B12 alloy. The B1 and B12 alloys also include a higher concentration of Al than the B alloy. Each depiction includes a representation of the bulk alloy (lower, solid black portion of each depiction) and a representation of the interface region. The thickness of the interface region of each alloy was determined by Auger depth profiling and the thicknesses obtained are indicated for each alloy (350 Å for the B alloy, 200 Å for the B1 alloy and 550 Å for the B12 alloy). The interface region includes catalytic metallic particles, oxide support matrix, and voids. The catalytic metallic particles are depicted as filled circles and the voids are depicted as open (white) circles or extended open (white) shapes (B12 alloy) in the interface region. The remaining portion of the interface region of the depiction of each alloy corresponds to the support matrix. The percent volume fraction of catalytic metallic particles, voids and support matrix in the interface region is also indicated below the depiction of each alloy. The average catalytic metallic particle size within the interface region is indicated above the interface region of the depiction of each alloy (41 Å for the B alloy, 41 Å for the B1 alloy and 35 Å for the B12 alloy). The average catalytic metallic particle size and volume fraction of catalytic metallic particles in the interface region were obtained from magnetic susceptibility measurements. The volume fraction of voids was determined by BET measurements and may also be estimated from micrograph images.

The interface region of the conventional B alloy contains 26% catalytic metallic particles, 70% oxide support matrix, and 4% voids. In the conventional B alloy, most of the voids are approximately spherical in shape with typical sizes that are smaller than the typical catalytic metallic particle. Upon microstructure tuning according to the instant invention to form the instant B1 alloy, the volume fraction in the interface region of oxide support matrix decreases while the volume fraction of catalytic metallic particles and voids increases. The interface region of the B1 alloy contains 42% catalytic metallic particles, 40% oxide support matrix, and 18% voids. The average size of catalytic metallic particles in the B1 alloy is similar to that of the B alloy, but the B1 alloy includes a higher number density of catalytic metallic particles. The catalytic metallic particles of the B1 alloy are more closely spaced than the catalytic metallic particles of the B alloy. The B1 alloy also includes a greater number of voids as well as voids having larger sizes relative to the B alloy. The B1 alloy includes some voids having an approximately spherical shape with sizes equal to or greater than the size of the typical catalytic metallic particle. Although the interface region of the B1 alloy is thinner than that of the B alloy, its increased porosity and higher number density of catalytic metallic particles lead to improved electrochemical activity as described hereinabove and discussed more fully in several of the examples hereinbelow. The low porosity of the interface region of the B alloy may preclude or inhibit access of electrochemically active species to the deeper portions of the interface layer (i.e. the portions closest to the bulk alloy) thus contributing to an underutilization of the potential electrochemical activity of the B alloy. In other words, even though the thickness of the interface region of the B alloy is formally 350 Å, the effective thickness may be much smaller due to an inability of electrochemically active species to penetrate the full depth of the interface region.

Upon inclusion of a greater concentration of the microstructure tuning element Cu in the alloy composition to form the instant B12 alloy, the volume fraction of the oxide support matrix further decreases and the volume fraction of catalytic metallic particles and voids further increase. The interface region of the B12 alloy contains 51% catalytic metallic particles, 25% oxide support matrix, and 24% voids. The thickness of the interface region of the B12 alloy has also increased to 550 Å. The average size of catalytic metallic particles in the B12 alloy has also decreased to 35 Å. This smaller size is consistent with the accelerated and directed preferential corrosion effect described hereinabove as the kinetic formation of a greater number of particles is favored over the formation of larger particles. The separation of catalytic metallic particles is smaller in the B12 alloy relative to the B1 alloy and the tendency for catalytic metallic particles to impinge or to form partially self-supporting structures in the support matrix is increased in the B12 alloy relative to the B1 alloy.

The presence of extended voids in the B12 alloy is also indicated in FIG. 1D as voids in the interface region of the B12 alloy are depicted as non-spherical, channel-like shapes. Spherical voids may also be present in the interface of the B12 alloy, but an increased tendency to form extended void structures with increasing concentration of microstructure tuning element is a feature of the instant alloys. The higher porosity of the interface region of the B12 alloy further promotes fill utilization of the full thickness of the interface region for electrochemical processes. The greater porosity increases the likelihood that electrochemical species are able to penetrate deeply into the interface region.

The microstructure of the B1 and B12 alloys are a manifestation of the accelerated and directed preferential corrosion associated with the instant microstructure tuning elements and demonstrate the increased porosity that accompanies microstructure tuning according to the instant invention. Microstructure tuning according to the instant invention provides alloys whose interface region includes a greater void volume fraction and/or a greater volume fraction of catalytic metallic particles than prior art alloys. According to the microstructure tuning of the instant invention, voids and/or catalytic metallic particles are formed at the expense of the support matrix. Similar to the conventional B alloy, the microstructure of prior art hydrogen storage alloys typically include a void volume fraction of about 4%. Alloys having microstructures tuned according to the instant invention exhibit higher or much higher void volume fractions in the interface region. Control of the void volume fraction may be achieved according to the instant invention by microstructure tuning through inclusion of a microstructure tuning element, control of alloy formation, treatment or operating conditions, and/or etching with an acid, a base or combination thereof. The degree of microstructure tuning can be continuously controlled (e.g. through the concentration of microstructure tuning element, the concentration of acids or bases used in etching, time of exposure in air, annealing temperature, time or ambient, etc.) to achieve void volume fractions in the interface region ranging from 4% to 24% or higher. Alloys having a void volume fraction in the interface region of at least 5% are provided by the instant invention. Alloys having a void volume fraction in the interface region of at least 10% are further provided by the instant invention. Alloys having a void volume fraction in the interface region of at least 15% are further provided by the instant invention. Alloys having a void volume fraction in the interface region of at least 20% are further provided by the instant invention.

In other embodiments, alloys having a high void volume fraction in combination with a high volume fraction of catalytic metallic particles are provided by the instant invention. Alloys having a void volume fraction in the interface region of at least 5% and a volume fraction of catalytic metallic particles in the interface region of at least 30%/o are provided by the instant invention Alloys having a void volume fraction in the interface region of at least 10% and a volume fraction of catalytic metallic particles in the interface region of at least 35% are provided by the instant invention. Alloys having a void volume fraction in the interface region of at least 15% and a volume fraction of catalytic metallic particles in the interface region of at least 40% are provided by the instant invention. Alloys having a void volume fraction in the interface region of at least 20% and a volume fraction of catalytic metallic particles in the interface region of at least 50% are provided by the instant invention.

Species that participate in thermal and/or electrochemical charging and discharging processes are expected to have higher mobility within and through the support matrix of the B1 and B12 alloys relative to the B0 alloy. The higher density of catalytic particles provides a stronger catalytic effect. As a result, lower charge transfer resistance and faster kinetics of charging and discharging are expected for the B1 and B12 alloys relative to the base B0 alloy. Analogous effects occur through comparable microstructure tuning achieved through control of processing parameters or inclusion of post-formation etching steps.

EXAMPLE 5

In this example, the performance of a nickel metal hydride battery having a negative electrode containing an embodiment of a hydrogen storage alloy having a microstructure according to the instant invention is described. A nickel metal hydride C cell battery was constructed and tested according to an HEV power test protocol. The C cell included a pasted negative electrode comprising the B12 alloy of EXAMPLE 1, a nickel hydroxide positive electrode (AP64NH1, includes nickel hydroxide particles with embedded Ni fibers. (See, for example, U.S. Pat. No. 6,177,213) on a nickel foam substrate (Inco 500, 500 $g/m^2$ basis weight), a KOH electrolyte and a fluorinated polypropylenelpolyethylene separator (Freudenberg FS2225). The specific power of the battery was measured using an HEV power test at 35° C. and SOC values of 100%, 80%, 50%, and 20%. Each state of charge (SOC) was reached by first charging to 100% SOC and then discharging at the C rate to the desired SOC. (Me C rate corresponds to the discharge rate required to fully discharge the cell in one hour. The C rate of a 4 A-h battery, for example, is 4 A.) As the discharging at the C rate was concluding, the voltage of the battery at the C rate current was measured for each SOC to obtain an initial voltage and current at each SOC. The initial voltage and current are subsequently used in determining the specific power upon further discharge from the SOC. This further discharge of the battery from each SOC was accomplished by applying a 10 sec, 10C current pulse to the battery. During the pulse, voltage values were measured at time delays of 2 sec, 6 sec and 10 sec following initiation of the pulse. The specific power at each of these times was computed. The specific power computation included a calculation of $\Delta V/\Delta I$, relative to the initial voltage and current, to obtain a resistance as well as determinations of the open circuit voltage ($V_{oc}$) and maximum current ($I_{max}$) of the battery. The specific powers reported in this example were calculated by computing the product ($½V_{oc}$)($½I_{max}$) and normalizing to mass.

Figure 2:
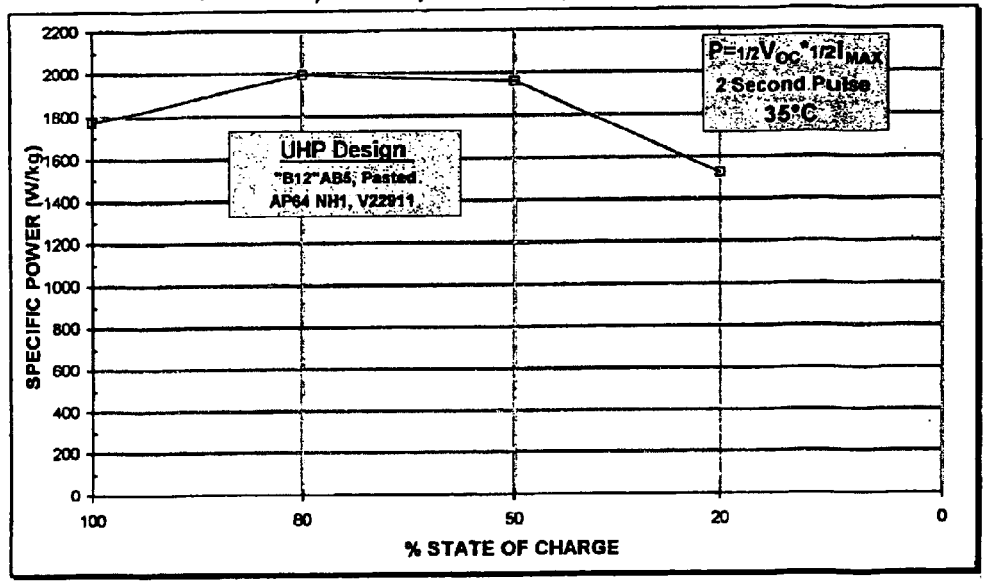
FIG. 2. Comparison of the specific power as a function of the state of charge at 35° C. for a C-cell battery that includes the instant B12 alloy as the active negative electrode material.
Figure 2:
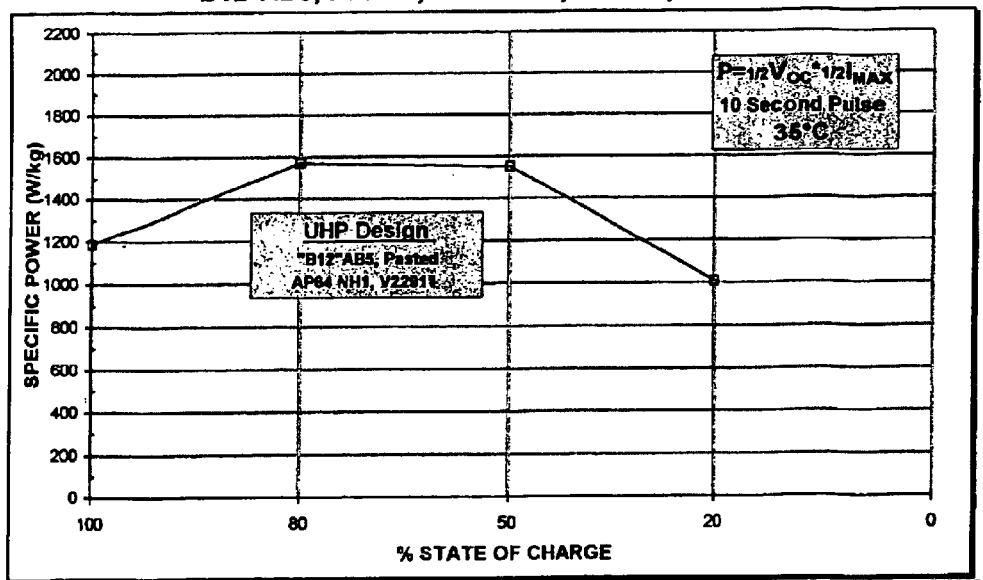

The results of the HEV power test at SOC values of 100%, 80%, 50% and 20% are shown in FIG. 2 herein. Specific power data are shown at time intervals of 2 sec and 10 sec following initiation of the 10C discharge pulse. Results for a UHP C cell battery design that included the instant B12 alloy as the active negative electrode material are shown. The data indicate high specific powers with a maximum power of about 2000 W/kg in the 2 sec data and 1600 W/kg in the 10 see data The specific power of the battery is more than 10% higher than the specific power of a control battery that included the base alloy B0 of EXAMPLE 1. Analogous tests on similar batteries that include the instant B1 alloy show a maximum power of about 1900 W/kg using a 2 sec, 10C pulse.

EXAMPLE 6

In this'example, the charge transfer resistance and double layer capacitance of a battery that includes an alloy having a microstructure according to the instant invention is compared to an analogous battery that includes a typical commercial alloy. A standard commercial C-cell battery design was used in the comparison. The battery design included a negative electrode containing a hydrogen storage alloy, a nickel hydroxide positive electrode, a separator and a KOH electrolyte. Two batteries were constructed. In one battery, the negative electrode included the B alloy of EXAMPLE 1 as the hydrogen storage material and in the other battery, B1 alloy of EXAMPLE 1 was used. Except for the hydrogen storage alloy used in the negative electrode, the batteries were otherwise identical. Any difference in battery performance is therefore attributable to the choice of hydrogen storage alloy.

Figure 3:
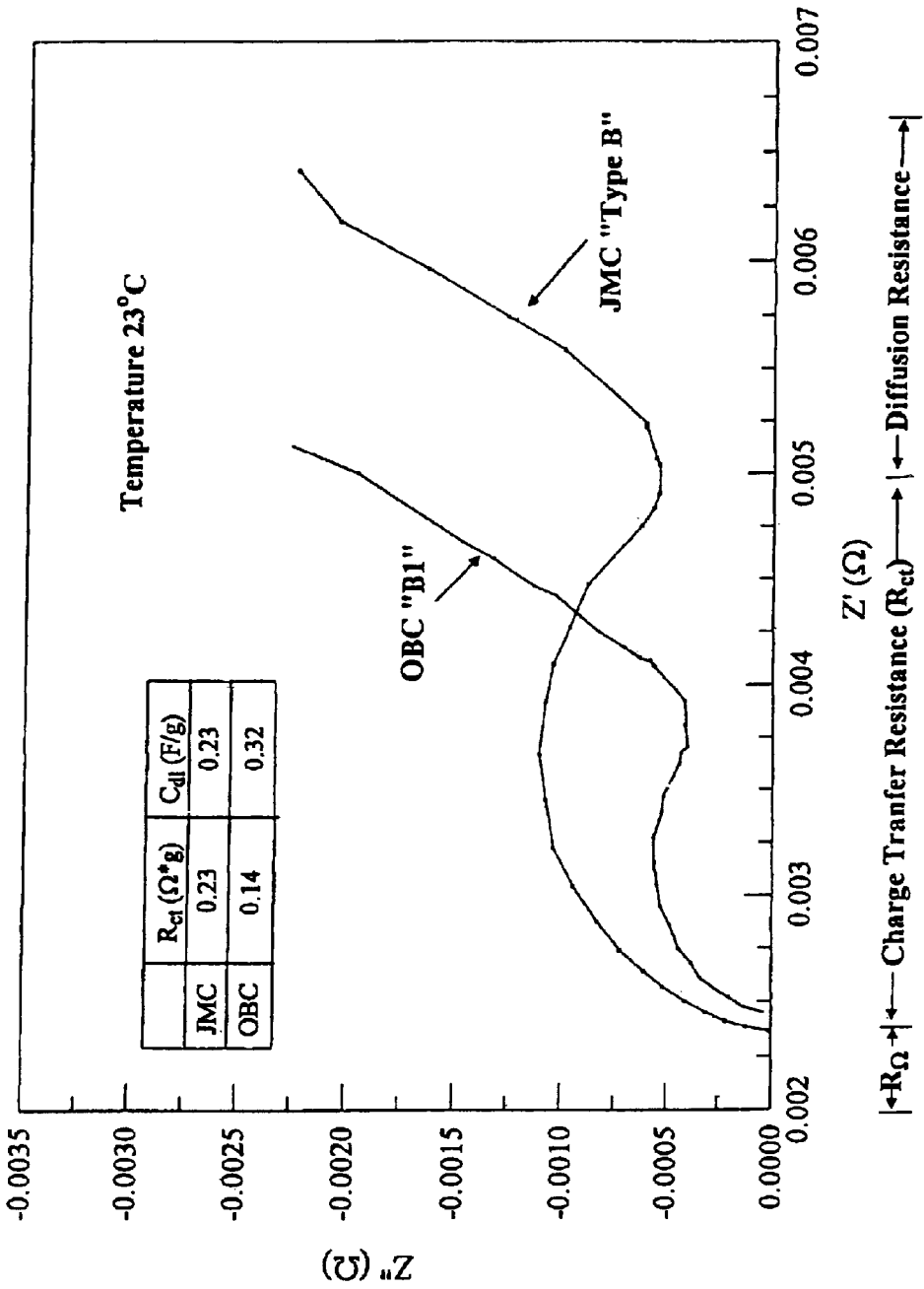
FIG. 3. Comparison of the complex impedance plots at 23° C. of C-cell batteries that include the instant B1 and the conventional B alloys, respectively, as the active negative electrode material.

The charge transfer resistance ($R_{CT}$) and double layer capacitance ($C_{dl}$) of the two batteries were obtained through complex impedance measurements. The measurements were completed at 23+ C. The results of the measurements are presented in FIG. 3 herein which shows the imaginary part Z of the complex impedance as a function of the real part Z of the complex impedance. The curve labeled "B1" corresponds to the battery including the instant B1 alloy and the curve labeled "B" refers to the battery including the commercial B alloy. Each curve includes a semi-circular portion and an upwardly sloping portion. The intercept of each curve with the Z axis provides the Ohmic resistance of each battery. The charge transfer resistance can be determined from the diameter of the semicircular portion of each curve and the slope of the upwardly sloping portion of each curve is related to the diffusion resistance. The double layer capacitance can be obtained from the standard electrochemical equations used in the analysis of the semicircular portion of each curve. The values of $R_{CT}$ and $C_{dl}$ computed from the complex impedance curve of each battery are shown in the inset of FIG. 3.

The instant B1 alloy leads to a decreased charge transfer resistance (0.14 $\Omega$-g vs. 0.23 $\Omega$-g) and increased double layer capacitance (0.32 F/g vs. 0.23 F/g) in the battery design relative to the conventional B alloy. The reduced value of $R_{CT}$ indicates that the charge transfer reaction at the electrode containing the B1 alloy proceeds with faster kinetics than the charge transfer reaction at the electrode containing the B alloy. The faster kinetics indicate are more favorable electrochemical reaction and are consistent with a greater porosity of the support matrix surrounding the catalytic metallic particles and/or a greater number density of catalytic metallic particles. The double layer capacitance is indicative of the surface area over which an electrochemical reaction occurs. The larger value of $C_{dl}$ for the battery based on the B1 alloy is consistent with a greater porosity in the vicinity of the electrochemical reaction sites. The impedance data of FIG. 3 indicate that microstructure tuning according to the instant invention leads to improved kinetics due to greater mobility of species participating in electrochemical reactions.

EXAMPLE 7

In this example, the low temperature properties of two embodiments of alloys whose microstructure has been tuned according to the instant invention are described. A UHP C-cell battery was constructed and tested at $-30°$ C. in an HEV power test. The C-cell included the positive electrode and separator described in EXAMPLE 5 hereinabove, a KOH electrolyte and a negative electrode that included the B12 hydrogen storage alloys described in EXAMPLE 1 hereinabove. The specific power of the battery was determined in an HEV power test at $-30°$ C. and various states of charge. The REV power test procedure is described in EXAMPLE 5 hereinabove, except that the product ($⅔V_{oc}$)($⅓I_{max}$) was used in the specific power calculation.

Figure 4:
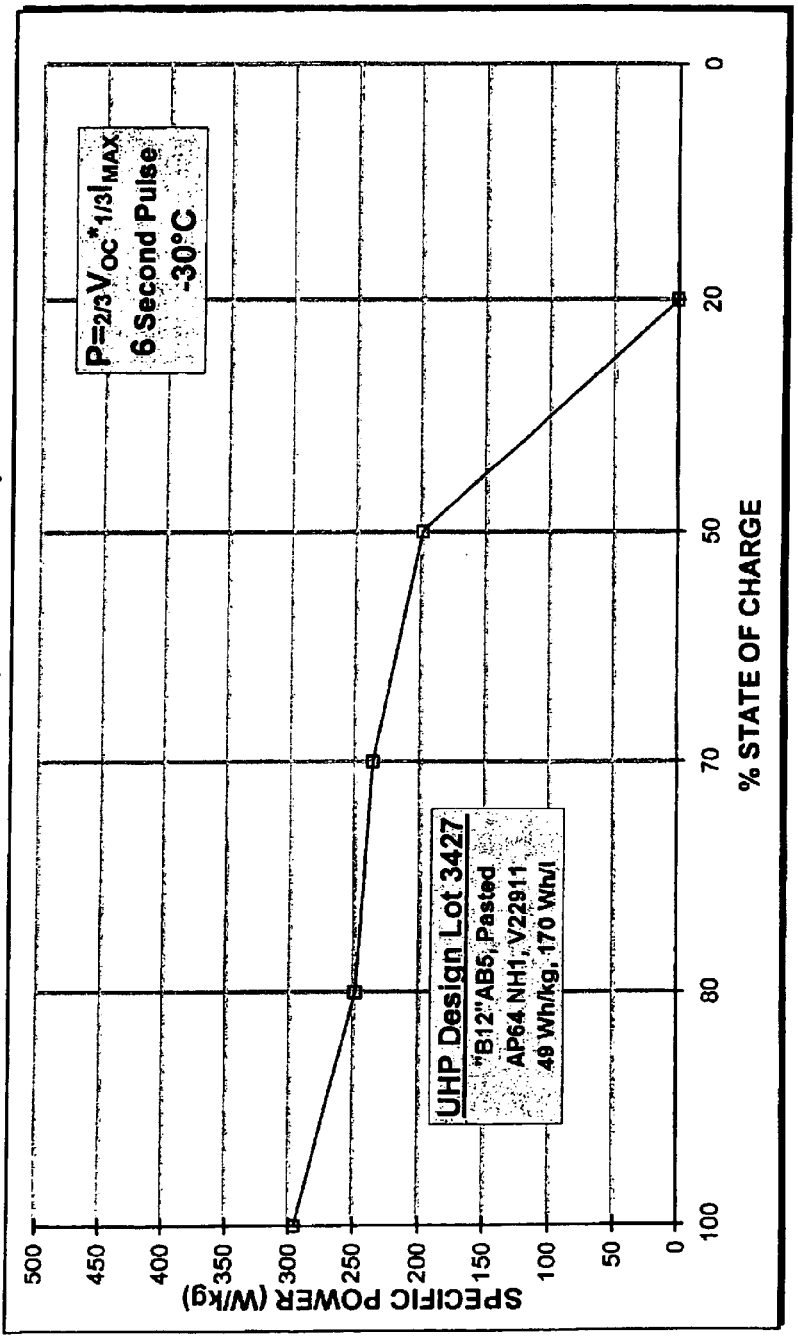
FIG. 4. Comparison of the specific power as a function of the state of charge at −30° C. for a C-cell battery that includes the instant B12 alloy as the active negative electrode material.

The results of the HEV power test are summarized in FIG. 4 herein. The specific power at a time delay of 6 sec following initiation of a 10 sec 10C discharge pulse of the battery at $-30°$ C. and different states of charge is shown. The HEV power test was also completed on comparable batteries that included the B1 and B alloys in the negative electrodes. The battery having a negative electrode that includes the B12 or B1 alloys displayed higher specific powers than a comparable battery having a negative electrode that included the conventional B alloy. The difference in specific power between batteries that included the instant B1 and B12 alloys and the battery that included the conventional B alloy became progressively and substantially greater as the state of charge of the batteries was reduced. The specific power of the battery based on the conventional B alloy decreased precipitously as the state of charge was reduced. At 50% SOC, the battery based on the B alloy exhibited essentially no power at $-30°$ C. In contrast, the battery based on the B12 alloy exhibited a decrease in specific power of only about 30% (from about 295 W/kg to about 200 W/kg) between 100% SOC and 50% SOC and the battery based on the B1 alloy exhibited a decrease of only about 50% between 1000% SOC and 50% SOC. At 50% SOC and $-30°$ C., batteries based on the B1 and B12 alloys exhibited specific powers that are two or more orders of magnitude greater than a battery based on a conventional B alloy.

The improved specific power of batteries based on the instant alloys at low temperature is significant because it enables the practical use of nickel metal hydride batteries in heretofore inaccessible operating environments. Design considerations for HEVs reveal a preference for batteries operating at less than 100% state of charge to achieve favorable regenerative braking characteristics. Current commercial HEVs, for example, utilize batteries at 50% state of charge. The data presented in FIG. 4 clearly indicate the superiority of batteries based on the instant alloys for use at low temperatures at all states of charge, especially at states of charge of 80% or less and most especially at states of charge of 50% or less. The excellent low temperature characteristics of batteries that include the instant hydrogen storage alloys also show that these batteries are well-suited to function as starter batteries in conventional vehicles.

EXAMPLE 8

In this example, the specific powers at −30° C. of batteries based on the instant B1 alloy and the conventional B alloy are further compared. A standard commercial C-cell battery design was used in the comparison. The battery design included a negative electrode containing a hydrogen storage alloy, a nickel hydroxide positive electrode and a KOH electrolyte. Three batteries were constructed. In two of the batteries, the negative electrode included the B1 alloy of EXAMPLE 1 as the hydrogen storage material and in a third battery, the conventional B alloy of EXAMPLE 1 was used. Except for the hydrogen storage alloy used in the negative electrode, the batteries were otherwise identical. The specific power of each battery was measured in an HEV power test at −30° C. and various states of charge. The HEV power test procedure is described in EXAMPLE 5 hereinabove.

Figure 5A:
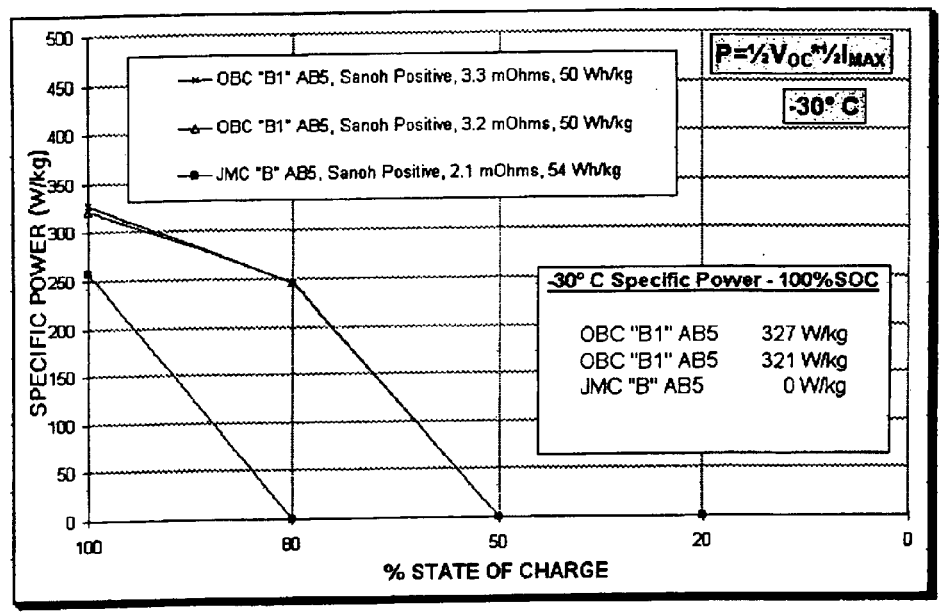
FIG. 5A. Comparison of the specific power as a function of the state of charge at −30° C. for C-cell batteries that include the instant B1 (2 specimens) and conventional B alloys, respectively, as the active negative electrode material.
Figure 5B:
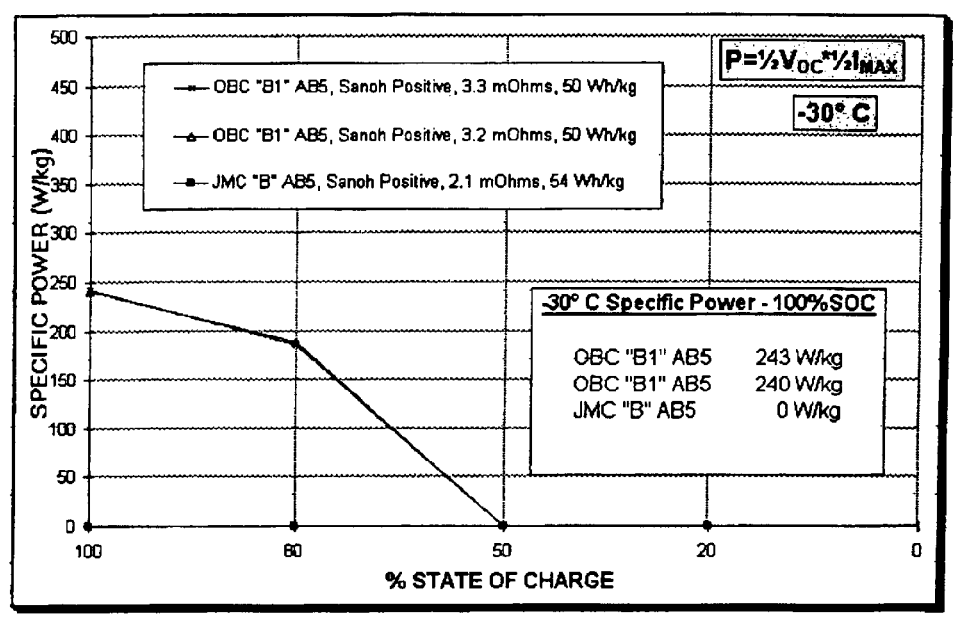
FIG. 5B. Comparison of the specific power as a function of the state of charge at −30° C. for C-cell batteries that include the instant B1(2 specimens) and conventional B alloys, respectively, as the active negative electrode material.

HEV power test results for the batteries of this example at −30° C. at time delays of 2 sec and 10 sec following initiation of a 10 sec 10C discharge pulse are shown in FIGS. 5A and 5B, respectively. For each time delay, the two batteries based on the instant B1 alloy performed substantially identically. In the 2 sec time delay results, the batteries based on the instant B1 alloy exhibited a specific power at 100% SOC that was more than 25% higher than that of the battery based on the conventional B alloy (about 325 W/kg (B1) vs. 258 W/kg (B)). At 80% SOC, the battery based on the conventional B alloy exhibited essentially no power. In contrast, the batteries based on the instant B1 alloy exhibited specific powers of about 250 W/kg at 80% SOC. In the 10 sec time delay results at −30° C., the battery based on the conventional B alloy exhibited essentially no power at any SOC and is completely unsuitable for operation under these test conditions. Batteries based on the B1 alloys, in contrast, exhibited specific powers of about 240 W/kg at 1 00% SOC and about 190 W/kg at 80'/o SOC.

The test results presented in FIGS. 5A and 5B further demonstrate the superiority of batteries based on the instant B1 alloy under low temperature operating conditions. The superiority is especially pronounced at low temperatures under long time delay and high rate discharge conditions. Improved long time delay performance indicates that batteries based on the instant alloys provide high powers well after initiation of a current draw and are therefore suitable for applications utilizing long current pulses. In contrast to batteries based on conventional alloys, whose power rapidly diminishes as the duration of a current pulse increases, batteries based on the instant alloys continue to provide high powers for long times following the initiation of a current pulse.

EXAMPLE 9

In this example, further low temperature specific power properties of batteries based on the instant B1 alloy are presented. The composition of the instant B1 alloy is presented in EXAMPLE 1. Three batteries were constructed. The batteries were C-cells that included the Freudenberg FS2225 separator, KOH electrolyte, AP64NH1 positive electrode material and Inco 500 nickel foam substrate described in EXAMPLE 5. The batteries also included a pasted negative electrode using the instant B1 alloy as the active material. Two batteries using etched (60% and 45% alkaline etch) B1 alloy and one battery using unetched B1 alloy were constructed for this example. The specific power of each battery was measured in an HEV power test at −30° C. and various states of charge. The HEV power test procedure is described in EXAMPLE 5 hereinabove.

Figure 6A:
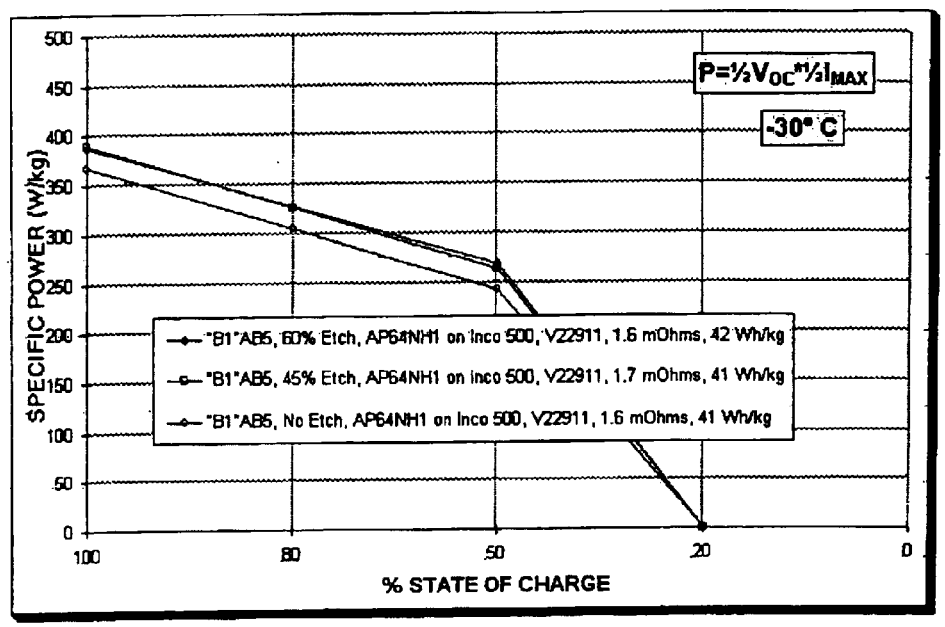
FIG. 6A. Comparison of the specific power as a function of the state of charge at −30° C. for C-cell batteries that include the instant B1 alloy, etched to differing degrees, as the active negative electrode material.
Figure 6B:
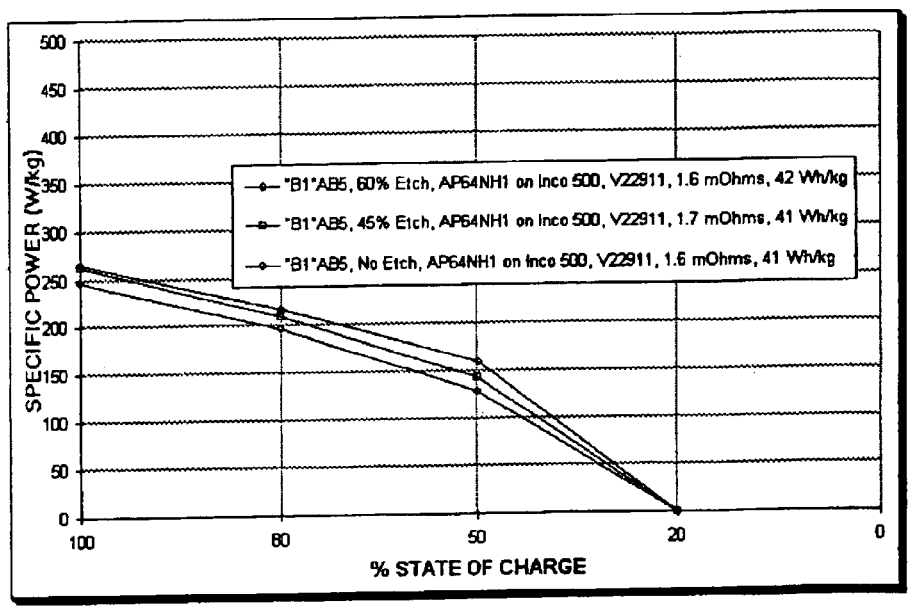
FIG. 6B. Comparison of the specific power as a function of the state of charge at −30° C. for C-cell batteries that include the instant B1 alloy, etched to differing degrees, as the active negative electrode material.

HEV power test results for the batteries of this example at −30° C. at time delays of 2 sec and 10 sec following initiation of a 10 sec 10 C discharge pulse are shown in FIGS. 6A and 6B, respectively. For each time delay, batteries that included an etched form of the instant B1 alloy exhibited slightly higher specific power than the battery that included an unetched form of the instant B1 alloy. Batteries that included the etched form of the instant B1 alloy at 100% SOC exhibited specific powers at −30° C. of about 385 W/kg at the end of a 2 sec, 10C pulse and about 260 W/kg at the end of a 10 sec, 10 C pulse. In contrast, batteries that included the unetched form of the instant B1 alloy exhibited specific powers of about 365 W/kg and 245 W/kg at corresponding respective conditions. All of the batteries showed similar gradual decreases in specific power as the SOC was lowered. All of the batteries exhibited excellent specific power at 50% SOC and −30° C. (above about 260 W/kg and 145 W/kg for the etched forms after a 2 sec, 10C and 10 sec, 10C pulses, respectively, and slightly less for the unetched forms).

EXAMPLE 10

In this example, further low-temperature specific power properties of batteries based on the instant B12 alloy are presented. The composition of the instant B12 alloy is presented in EXAMPLE 1. Three C-cell batteries were constructed for this example. The batteries included the Freudenberg FS2225 separator described in EXAMPLE 5, a KOH electrolyte, and a compacted negative electrode that included the instant B12 alloy in unetched form. Two batteries included the AP64NH1 positive electrode material described in EXAMPLE 5 and one battery included the AP64.S5 positive electrode material (includes about nickel metal spheres embedded within nickel hydroxide). The specific power of each battery was measured in an HEV power test at −30° C. and various states of charge. The HEV power test procedure is described in EXAMPLE 5 hereinabove.

Figure 7:
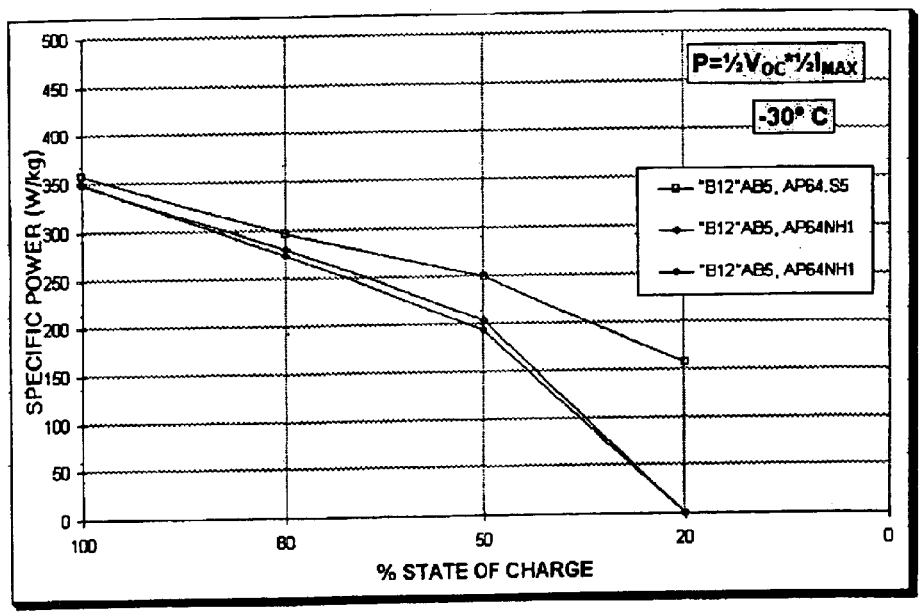
FIG. 7. Comparison of the specific power as a function of the state of charge at −30° C. for C-cell batteries that include the instant B1 2 alloy as the active negative electrode material and the AP64NH1 (2 specimens) or AP64.S5 positive electrodes, respectively.

HEV power test results for the batteries of this example at −30° C. at a time delay of 2 sec following initiation of a 10 sec, 10C discharge pulse are shown in FIG. 7. The results indicate that the battery that included the AP64.S5 positive electrode material exhibited a slightly higher specific power at 100% SOC (about 360 W/kg vs. about 350 W/kg) and that this battery also exhibited a more gradual decrease in specific power as the SOC was reduced than the batteries that included the AP64NH1 positive electrode material. The three batteries of this example all exhibited a specific power of about 200 W/kg or greater at 50% SOC and −30° C. with the batteries that included the AP64.S5 positive electrode material exhibiting a specific power of about 250 W/kg at 500% SOC and −30° C. The battery that included the AP64.S5 positive electrode material continued to exhibit a significant specific power at 20% SOC and −30° C. (about 160 W/kg).

EXAMPLE 11

In this example, the charge transfer resistance and double layer capacitance of a compacted electrode that includes the instant B1 alloy are compared to the charge transfer resistance and double layer capacitance of an analogous electrode that includes the conventional B0 alloy at three different temperatures. The compositions of the B1 and B0 alloys are presented in EXAMPLE 1 hereinabove.

Figure 8:
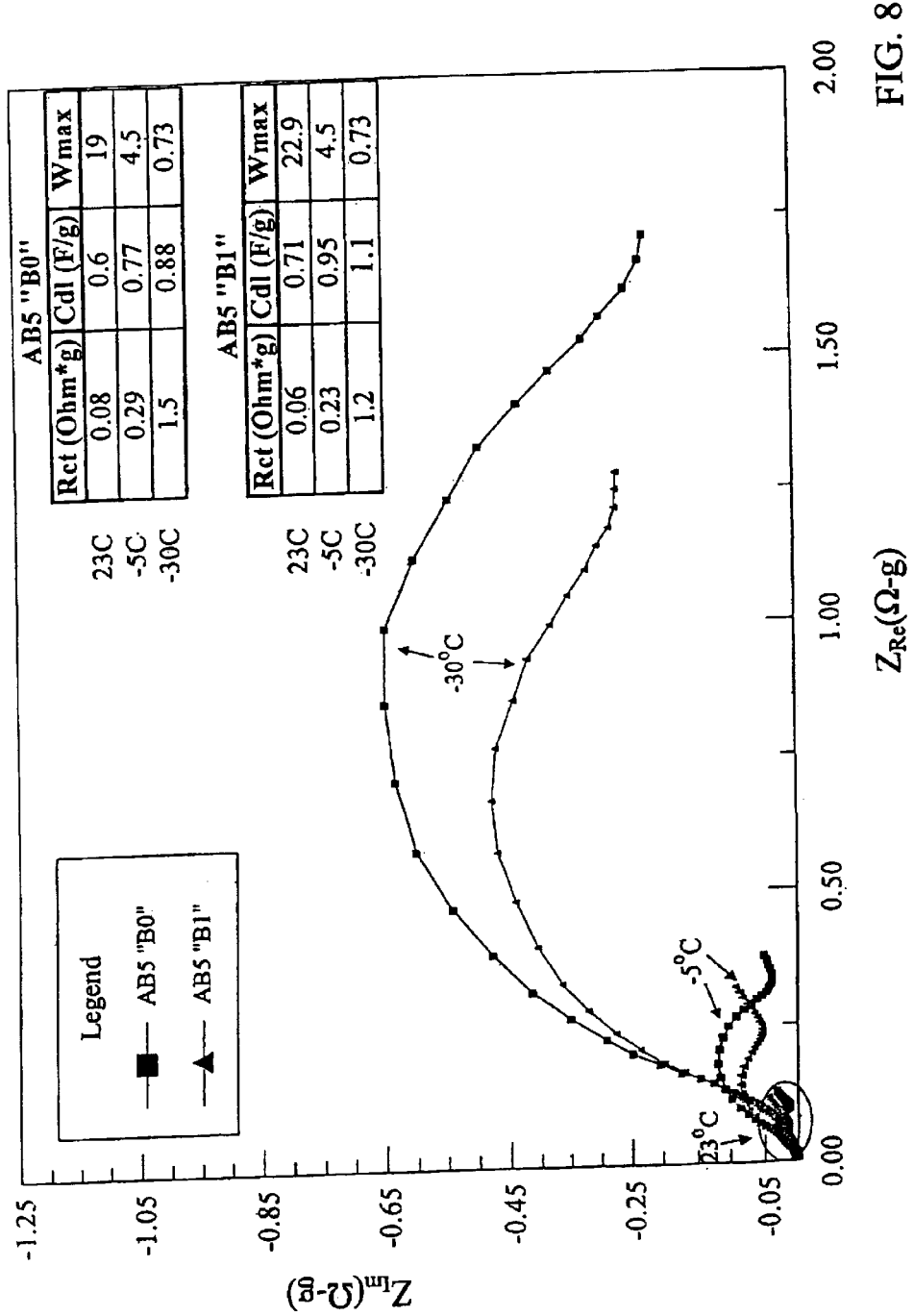
FIG. 8. Comparison of the complex impedance plots at 23° C., −5° C. and −30° C. of compacted electrodes that include the instant B1 and the conventional B0 alloys.

The charge transfer resistance ($R_{CT}$) and double layer capacitance ($C_{dl}$) of the two electrodes were obtained through complex impedance measurements. The impedance measurements were completed using an electrochemical cell that included a mercury/mercury oxide reference electrode, a nickel hydroxide counter electrode, a working electrode that included the B0 or B1 alloy, and a 30% KOH electrolyte. Impedance measurements were completed at 23° C., −5° C., and −30° C. The results of the measurements are presented in FIG. 8, which shows the imaginary part ($Z_{Im}$) of the complex impedance as a function of the real part ($Z_{Re}$) of the complex impedance. Measurements completed at the three different temperatures for both electrodes are included and labeled in FIG. 8. Filled square symbols correspond to results obtained for the B0 alloy and the filled triangle symbols correspond to results obtained for the B1 alloy. Smooth curves connect the data points for each battery at each measurement temperature. The curves are generally semicircular in appearance and may be analyzed using standard electrochemical equations, as described in EXAMPLE 6, to obtain the charge transfer resistance (Ran) and double layer capacitance ($C_{dl}$) for each electrode at each temperature. The results of the analysis are summarized in the inset of FIG. 8. The column labeled $W_{max}$ corresponds to the frequency associated with the maximum of the semicircular curves obtained in the impedance measurements. $R_{CT}$, $C_{dl}$, and $W_{max}$ are listed as Rct, Cdl, and Wmax, respectively, in FIG. 8.

The results indicate that the charge transfer resistance of the electrode containing the B1 alloy was significantly lower than the charge transfer resistance of the electrode containing the B0 alloy at all three measurement temperatures. The magnitude of the reduction was greatest at −30° C. The lower charge transfer resistance for the B1 alloy indicates faster electrode kinetics and is consistent with the hypothesis described hereinabove in which the instant inventors ascribe the improved performance of the instant alloys to greater species mobility in the vicinity of metallic catalytic particles resulting from an increased porosity of the surrounding support matrix and/or increased density of catalytic metallic particles due to microstructure tuning according to the instant invention. The results also indicate that the double layer capacitance of the electrode containing the instant B1 alloy was greater than that of the electrode containing the conventional B0 alloy at all three measurement temperatures. A higher double layer capacitance indicates a higher surface area of electrochemical reaction for the electrode containing the B1 alloy. The complex impedance results of this example are consistent with faster discharge kinetics and higher specific powers for batteries that include negative electrodes containing the instant B1 alloy.

EXAMPLE 12

In this example, the charge transfer resistance ($R_{CT}$) and double layer capacitance ($C_{dl}$) of electrodes containing the conventional B0, instant B1 and instant B12 alloys are compared at three different temperatures. The compositions of the B0, B1 and B1 2 alloys are presented in EXAMPLE 1. One compacted electrode containing each of the three alloys was prepared for this example. The same preparation method was used for the three electrodes of this example.

Figure 9:
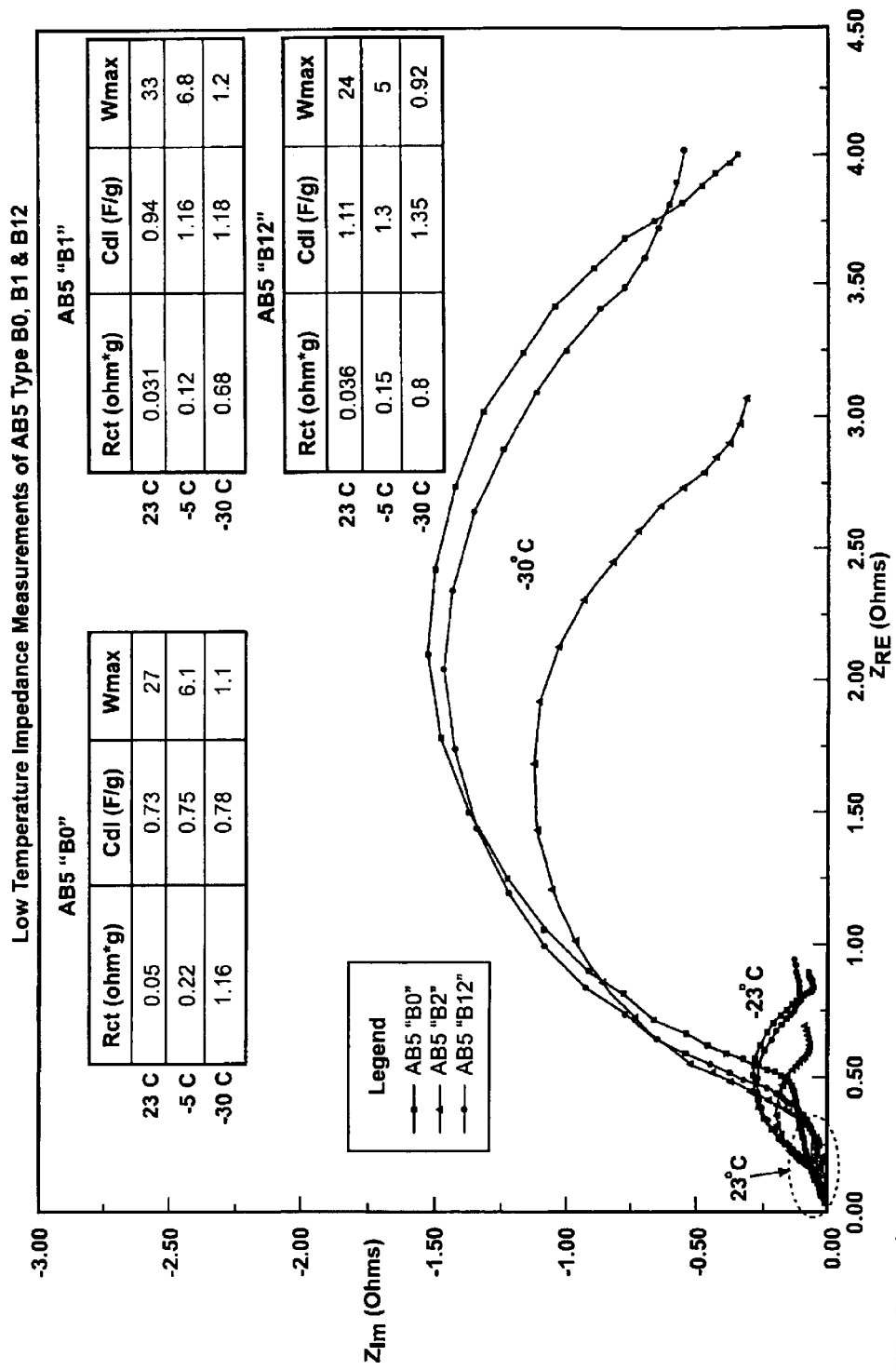
FIG. 9. Comparison of the complex impedance plots at 23° C., −5° C. and −30° C. of compacted electrodes that include the instant B1, instant B12 and conventional B0 alloys.

The charge transfer resistance ($R_{CT}$) and double layer capacitance ($C_{dl}$) of the three electrodes were obtained through complex impedance measurements. The impedance measurements were completed using an electrochemical cell that included a mercury/mercury oxide reference electrode, a nickel hydroxide counter electrode, a working electrode that included one of the B0, B1 or B12 alloys, and a 30% KOH electrolyte. Impedance measurements were completed at 23 ° C., −5° C., and −30° C. The results of the measurements are presented in FIG. 9, which shows the imaginary part ($Z_{Im}$) of the complex impedance as a function of the real part ($Z_{Re}$) of the complex impedance. Measurements completed at the three different temperatures for each of the three electrodes are included and labeled in FIG. 9. Filled square symbols correspond to results obtained for the B0 alloy, filled triangle symbols correspond to results obtained for the B1 alloy and filled circle symbols correspond to results obtained for the B12 alloy. Smooth curves connect the data points for each battery at each measurement temperature. The curves are generally semi-circular in appearance and may be analyzed using standard electrochemical equations, as described in EXAMPLE 6, to obtain the charge transfer resistance ($R_{CT}$) and double layer capacitance ($C_{dl}$) for each electrode at each temperature. The results of the analysis are summarized in the inset of FIG. 9. The column labeled $W_{max}$ corresponds to the frequency associated with the maximum of the semicircular curves obtained in the impedance measurements. $R_{CT}$, $C_{dl}$, and $W_{max}$ are listed as Rct, Cdl, and Wmax, respectively, in FIG. 9.

The results indicate that the charge transfer resistance of the electrodes that include the instant B1 and B12 alloys are substantially lower than the charge transfer resistance of the electrode that includes the conventional B0 alloy at all three measurement temperatures. The magnitude of the reduction was greatest at −30° C. The lower charge transfer resistance for the B1 and B12 alloys indicate faster electrode kinetics and is consistent with the hypothesis described hereinabove in which the instant inventors ascribe the improved performance of the instant alloys to greater species mobility in the vicinity of metallic catalytic particles resulting from an increased porosity of the surrounding support matrix and/or increased density of catalytic metallic particles due to inclusion microstructure tuning according to the instant invention. The results also indicate that the double layer capacitance of the electrodes containing the instant B1 and B12 alloys was greater than that of the electrode containing the conventional B0 alloy at all three measurement temperatures. A higher double layer capacitance indicates a higher surface area of electrochemical reaction for the electrode containing the B1 and B12 alloys. The complex impedance results of this example are consistent with faster discharge kinetics and higher specific powers for batteries that include negative electrodes containing the instant B1 and B12 alloys.

EXAMPLE 13

In this example, the polarization properties of electrodes containing the conventional B0 alloy, the instant B1 alloy and the instant B12 alloy are compared at three different temperatures. The compositions of the B0, B1 and B12 alloys are presented in EXAMPLE 1. One compacted electrode containing each of the three alloys was prepared for this example. The electrodes used in this example are the same electrodes considered in EXAMPLE 12.

Figure 10:
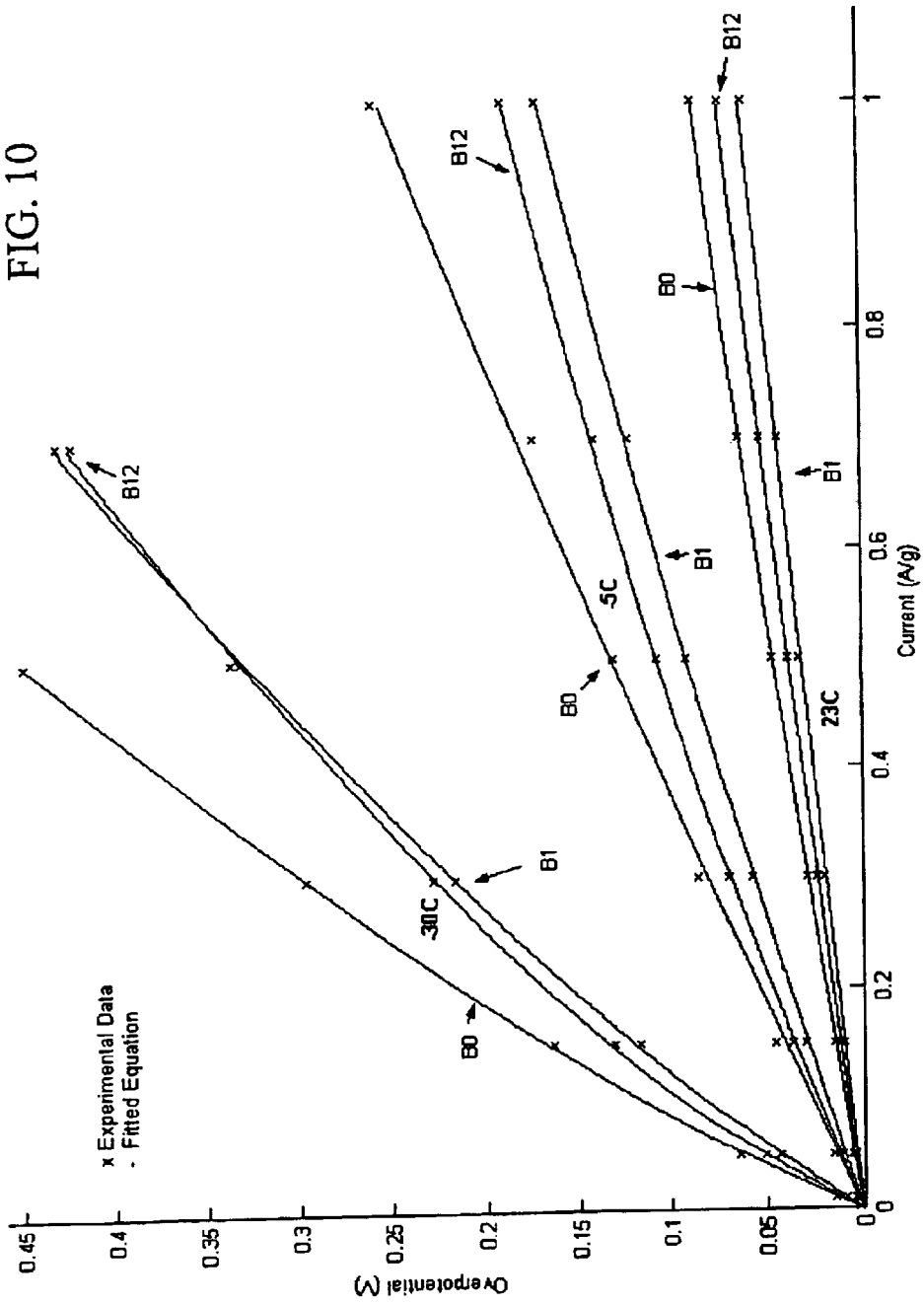
FIG. 10. Comparison of the overpotential as a function of discharge current at 23° C., −5° C. and −30° C. of compacted electrodes that include the instant B1, instant B12 and conventional B0 alloys.

The polarization of each of the three electrodes was measured at 23° C., −5° C., and −30° C. The polarization was measured as the electrode overpotential upon application of a 10 sec discharge current pulse to electrodes initially at 80% SOC (state of charge). The polarization measurements were completed using an electrochemical cell that included a mercury/mercury oxide reference electrode, a nickel hydroxide counter electrode, a working electrode that included the B0, B1 or B12 alloy, and a 30% KOH electrolyte. The overpotential is a measure of the displacement of an electrode from its equilibrium potential in response to an applied current. A lower overpotential at a given applied current generally indicates greater facility (e.g. faster kinetics, less energy dissipation) of a particular electrochemical reaction. The overpotential as a function of discharge current for each of the three electrodes at each measurement temperature is shown in FIG. 10. Data points are denoted by the symbol "x". The overpotential increases with decreasing temperature for electrodes based on each of the alloys, but the increase is most pronounced for the B0 electrode. An increasing overpotential implies a deterioration of electrode performance at low temperatures with a significantly greater deterioration for the B0 electrode than for the B1 and B12 electrodes. The inhibited deterioration of the B1 and B12 electrodes at low temperatures underlies the improved low temperature characteristics of batteries that include negative electrodes containing the B1 and B12 alloys discussed in several examples hereinabove.

Analysis of the overpotential variation with current was completed using a modified form of the Butler-Volmer equation that accounts for porosity. Conventionally, Butler-Volmer analysis of electrode overpotential is based on a smooth electrode approximation in which the sites of electrochemical reactivity are located directly at the electrode surface so that the electrode presents no mobility barriers to reaction. In the instant electrodes, however, the surfaces are not smooth, but rather are porous, with barriers to mobility as described hereinabove. Consequently, it is desired to include the effects of porosity on the overpotential. The modified form of the Butler-Volmer equation adapted for analysis of the overpotential data of this example is the following:

$$\eta = b\ln\left[\frac{i}{2i_0} + \sqrt{\left(\frac{i}{2i_0}\right)^2 + 1}\right] + iR_p$$

where $\eta$ is the overpotential, b is a Tafel constant (divided by 2.3 to account for a transformation from common to natural logarithms), $i_0$ is the exchange current density, i is the applied current density, and $R_p$ is the pore resistance. The term $iR_p$ accounts for the contribution of the pore resistance to the overpotential.

The value of $R_p$ reflects the influence of porosity on overpotential at a particular current. The value of $R_p$ is determined by the microstructure of the electrode material and the characteristics of the electrochemically relevant species that must penetrate the microstructure in order to effect reaction. An open, porous microstructure provides little inhibition to the mobility of chemical species at or in the vicinity of the electrode surface and/or catalytic sites of reactivity or to the mobility of conductive ionic species through the electrode. As a result, a porous microstructure is conducive to a small pore resistance. A dense microstructure, particularly one that has sites of electrochemical reactivity away from the surface, provides a substantial barrier to mobility and is conducive to a large pore resistance. For a particular microstructure, pore resistance may also depend on the size, shape, charge and other characteristics of the electrochemically relevant species that must penetrate the microstructure in order to undergo reaction. Smaller molecules, for example, generally exhibit higher mobilities with respect to a particular microstructure than larger molecules. The pore resistance reflects a balance of several contributing factors.

The overpotential as a function of current data presented in FIG. 10 was fit using the above equation. The results of the fits are indicated as solid curves in FIG. 10. The fitting provides values of the Tafel constant, exchange current density and pore resistance of each electrode at the three measurement temperatures. The pore resistance results are of particular interest in this example and are summarized in the following Table 3 for the three electrodes.

TABLE 3

| Electrode Alloy | Temperature | $R_p$ ($\Omega$-g) |
| --- | --- | --- |
| B0 | 23° C. | 0.026 |
|  | −5° C. | 0.1895 |
|  | −30° C. | 0.615 |
| B1 | 23° C. | 0.028 |
|  | −5° C. | 0.093 |
|  | −30° C. | 0.418 |
| B12 | 23° C. | 0.0241 |
|  | −5° C. | 0.0895 |
|  | −30° C. | 0.371 |

At 23° C., the pore resistance of the three electrodes that include the B0, B1 and B12 alloys is similar. The similarity in pore resistance is consistent with the relatively small differences between the overpotential curves of the three electrodes at 23° C. As the measurement temperature was decreased, the overpotential curves of the electrodes that included the B1 and B12 alloys remained similar. The overpotential curve of the electrode that included the B0 alloy, however, deviated significantly from the overpotential curves of the electrodes that included the B1 and B12 alloys. More specifically, the overpotential curve of the B0 electrode was shifted to higher overpotentials relative to the overpotential curves of the B1 and B12 electrodes at −5° C. and −30° C. The upward shift in the overpotential of the B0 electrode was especially pronounced at higher current levels. The upward shift indicates that the electrochemical reaction occurs less favorably at the B0 electrode than at the B1 or B12 electrodes at −5° C. and −30° C. The results presented in TABLE 3 indicate that the pore resistance is a contributing factor in the inhibited reaction at the B0 electrode. At both −5° C. and −30° C., the pore resistance of the B0 electrode is substantially higher than the pore resistance of the B1 and B12 electrodes. The higher pore resistance indicates a greater mobility barrier for the electrochemically active species with respect to the catalytic metallic particles of the B0 electrode as well as a greater mobility barrier for conductive ionic species within or through the electrode. The lower pore resistances of the B1 and B12 electrodes at −5° C. and −30° C. indicate greater accessibility of electrochemically active species to catalytic metallic particles. The results of this example indicate that microstructure tuning according to the instant invention increases the porosity of the support material surrounding catalytic metallic particles and as a result, that more favorable electrochemical reactivity is achieved at low temperatures.

EXAMPLE 14

In this example, the cycle life of a battery that includes the instant B1 alloy is compared to the cycle life of four analogous control batteries that include commercial hydrogen storage alloys. A standard commercial C-cell battery design was used in the comparison of this example. The battery design included a negative electrode containing a hydrogen storage alloy, a nickel hydroxide positive electrode, a separator and a KOH electrolyte. Five batteries were used in the cycle life comparison. Each battery included a different hydrogen storage alloy in the negative electrode, but the batteries were otherwise identical in construction. Four of the five batteries, the control batteries, included commercial alloys that were similar in composition to the B alloy described in EXAMPLE 1. Each of the commercial alloys included about 12% Co and no Cu. The fifth battery included the instant B1 alloy in the negative electrode. In the B1 alloy, the Co content was about 5% and 3.4% Cu was included. The cycle life of each of the batteries was tested to examine the stability of the battery capacity upon repeated cycles of charging and discharging. Charging of each battery was completed at a C/2 rate with negative $\Delta V$ as the method of charge termination. Under this method, charging was terminated when a 3 mV decrease in voltage was detected. Discharging of each battery was completed at a C12 rate until the battery voltage decreased to 0.9 V. Each cycle of this example includes one charging step and one discharging step and is repeated until the battery capacity drops to less than 70% of its initial capacity.

Figure 11:
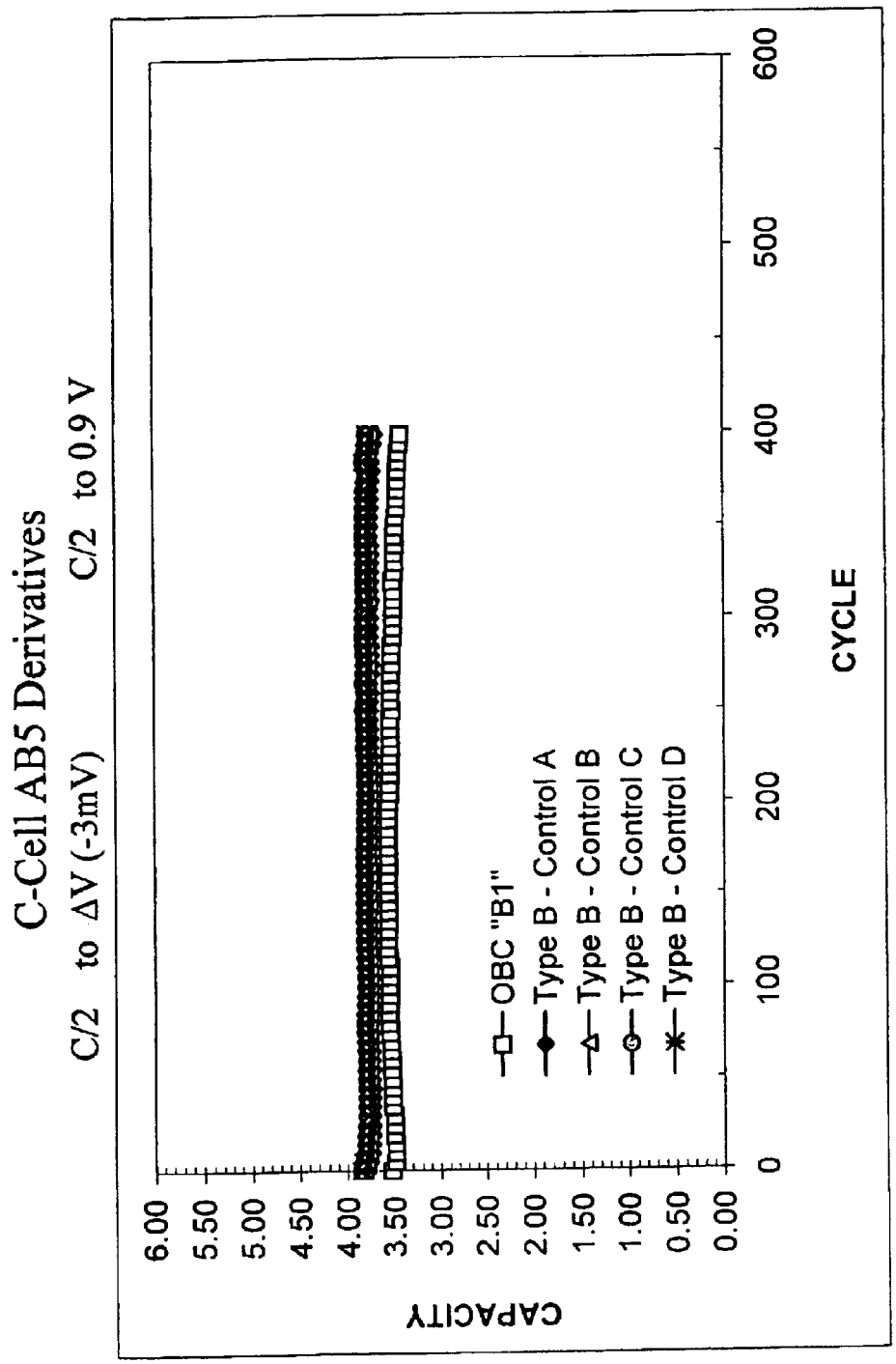
FIG. 11. Comparison of the cycle life characteristics of C-cell batteries that include the instant B1 (open squares) and several conventional alloys, respectively, as the active negative electrode material.

The results of the cycle life tests are shown in FIG. 11 herein. The testing shows that the battery based on the instant B1 alloy exhibited a stable capacity out to at least 400 cycles. The stability of the capacity of the battery based on the B1 alloy compares favorably with the stabilities of the control batteries. The cycling results indicate that microstructure tuning according to the instant invention does not detrimentally effect the cycle life out to at least 400 cycles.

The instant invention provides thermal and electrochemical hydrogen storage materials as well as electrodes, batteries, fuel cells etc. constructed therefrom that offer superior power, especially at low temperatures, through microstructure tuning. A reduction in cost is an added benefit in some embodiments herein wherein one or more of the instant microstructure tuning elements is substituted in whole or in part for a costly element present in an unmodified alloy composition. In several of the instant alloys presented in EXAMPLE 1, for example, tuning elements such as Cu, Fe or Zn replace a portion of the Co present in an unmodified alloy composition such as the B0 base alloy composition. These replacements provide a cost advantage to the instant alloys because Co is one of the most expensive elements in many unmodified alloy compositions. Co is typically included in an alloy composition to improve the cycle life of the alloy. As discussed in EXAMPLE 14 hereinabove, however, some embodiments of the instant invention shows that it is possible to include one or more of the instant formula modifier elements in a modified alloy composition that includes less Co while providing excellent lifetime cycling characteristics.

The disclosure and discussion set forth herein is illustrative and not intended to limit the practice of the instant invention. Numerous equivalents and foreseeable variations thereof are envisioned to be within the scope of the instant invention. It is the following claims, including all equivalents, in combination with the foregoing disclosure, which define the scope of the instant invention.

We claim:

1. A hydrogen storage alloy having a bulk region and an interface region, said interface region comprising catalytic metallic particles supported by a support matrix and voids, said catalytic metallic particles having diameters of less than about 100 Å, said catalytic metallic particles and said voids being distributed throughout said interface region, wherein the volume fraction of said voids in said interface region is greater than 5%.

2. The hydrogen storage alloy of claim 1, wherein said catalytic metallic particles comprise a transition metal.

3. The hydrogen storage alloy of claim 1, wherein said catalytic metallic particles comprise nickel.

4. The hydrogen storage alloy of claim 3, wherein said catalytic metallic particles further comprise copper.

5. The hydrogen storage alloy of claim 3, wherein said catalytic metallic particles further comprise iron, tin or zinc.

6. The hydrogen storage alloy of claim 1, wherein said catalytic metallic particles comprise a nickel-cobalt-copper alloy.

7. The hydrogen storage alloy of claim 1, wherein said catalytic metallic particles have diameters of less than 50 Å.

8. The hydrogen storage alloy of claim 1, wherein said catalytic metallic particles have diameters of less than 30 Å.

9. The hydrogen storage alloy of claim 1, wherein the volume fraction of said catalytic metallic particles in said interface region is greater than 30%.

10. The hydrogen storage alloy of claim 1, wherein the volume fraction of said catalytic metallic particles in said interface region is greater than 40%.

11. The hydrogen storage alloy of claim 1, wherein the volume fraction of said catalytic metallic particles in said interface region is greater than 50%.

12. The hydrogen storage alloy of claim 1, wherein said catalytic metallic particles vary in proximity from 2–300 Å in said interface region.

13. The hydrogen storage alloy of claim 1, wherein said catalytic metallic particles vary in proximity from 50–100 Å in said interface region.

14. The hydrogen storage alloy of claim 1, wherein said catalytic metallic particles are substantially self-supporting.

15. The hydrogen storage alloy of claim 1, wherein said volume fraction of said voids in said interface region is greater than 10%.

16. The hydrogen storage alloy of claim 1, wherein said volume fraction of said voids in said interface region is greater than 15%.

17. The hydrogen storage alloy of claim 1, wherein said volume fraction of said voids in said interface region is greater than 20%.

18. The hydrogen storage alloy of claim 1, wherein said voids are substantially spherical.

19. The hydrogen storage alloy of claim 18, wherein the diameters of said spherical voids are less than about 100 Å.

20. The hydrogen storage alloy of claim 18, wherein the average diameter of said spherical voids is substantially the same as the average diameter of said catalytic metallic particles.

21. The hydrogen storage alloy of claim 1, wherein said voids are channels.

22. The hydrogen storage alloy of claim 21, wherein said channels have a cross-sectional dimension of 10–20 Å.

23. The hydrogen storage alloy of claim 21, wherein said channels have a longitudinal dimension of greater than about 20 Å.

24. The hydrogen storage alloy of claim 21, wherein said channels are tubular.

25. The hydrogen storage alloy of claim 21, wherein said channels have platelet-like structures.

26. The hydrogen storage alloy of claim 1, wherein said bulk region comprises a rare earth element or alloy.

27. The hydrogen storage alloy of claim 1, wherein said bulk region comprises lanthanum or mischmetal.

28. The hydrogen storage alloy of claim 1, wherein said bulk region comprises a transition metal element or alloy.

29. The hydrogen storage alloy of claim 1, wherein said bulk region comprises nickel, titanium, magnesium or vanadium.

30. The hydrogen storage alloy of claim 1, wherein said bulk region comprises copper, zinc, tin or iron.

31. The hydrogen storage alloy of claim 1, wherein said bulk region comprises a component A and a component B, said component A and said component B forming an alloy in which the atomic ratio of component A to component B is about 1:5, said component A comprising a rare earth element, said component B comprising a transition metal.

32. The hydrogen storage alloy of claim 31, wherein component B comprises copper.

33. The hydrogen storage alloy of claim 32, wherein the atomic ratio of copper to component A is at least 0.1:1.

34. The hydrogen storage alloy of claim 32, wherein the atomic ratio of copper to component A is at least 0.2:1.

35. The hydrogen storage alloy of claim 32, wherein the atomic ratio of copper to component A is at least 0.3:1.

36. The hydrogen storage alloy of claim 1, wherein said bulk region comprises a component A and a component B, said component A and said component B forming an alloy in which the atomic ratio of component A to component B is about 1:2, said component A comprising a transition metal, said component B comprising a transition metal.

37. The hydrogen storage alloy of claim 1, wherein said interface region and said bulk region are formed upon activation of a starting material, said activation inducing accelerated directed and preferential corrosion of said bulk region, said corrosion producing said interface region.

38. The hydrogen storage alloy of claim 1, wherein said interface region and said bulk region are formed upon etching a starting material, said etching producing said interface region from the surface of said starting material.

* * * * *